(12) United States Patent
Gila et al.

(10) Patent No.: US 10,579,161 B2
(45) Date of Patent: Mar. 3, 2020

(54) ION WRITING CALIBRATION

(71) Applicant: Hewlett-Packard Development Company, L.P., Spring, TX (US)

(72) Inventors: Omer Gila, Palo Alto, CA (US); Napolean J. Leoni, Palo Alto, CA (US); Henryk Birecki, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 236 days.

(21) Appl. No.: 15/307,769

(22) PCT Filed: Jul. 31, 2014

(86) PCT No.: PCT/US2014/049284
§ 371 (c)(1),
(2) Date: Oct. 28, 2016

(87) PCT Pub. No.: WO2016/018408
PCT Pub. Date: Feb. 4, 2016

(65) Prior Publication Data
US 2017/0052602 A1    Feb. 23, 2017

(51) Int. Cl.
*G06F 3/03*    (2006.01)
*B41J 2/415*   (2006.01)
*G09G 3/34*    (2006.01)
*G06F 3/038*   (2013.01)
*G09G 5/26*    (2006.01)

(52) U.S. Cl.
CPC ............ *G06F 3/0321* (2013.01); *B41J 2/415* (2013.01); *G06F 3/03* (2013.01); *G06F 3/038* (2013.01); *G09G 3/344* (2013.01); *G09G 5/26* (2013.01); *G09G 2354/00* (2013.01); *G09G 2360/145* (2013.01)

(58) Field of Classification Search
CPC .......... G06F 3/0321; G06F 3/03; G06F 3/038; B41J 2/415; G09G 5/26; G09G 2354/00
See application file for complete search history.

(56) References Cited

U.S. PATENT DOCUMENTS 4,814,797 A    3/1989   Haneda et al.
5,333,038 A    7/1994   Mizoguchi et al.
5,866,284 A    2/1999   Vincent
6,333,754 B1  12/2001   Oba et al.
(Continued)

FOREIGN PATENT DOCUMENTS

JP    1075367 A     3/1998
JP    H1075367      3/1998
JP    3737593 B2    1/2006

OTHER PUBLICATIONS

New HP Photosmart Pro B8850 Photo Printer delivers key high-end printing technology at an affordable price for the advanced amateur photographer.

*Primary Examiner* — Sejoon Ahn
(74) *Attorney, Agent, or Firm* — Dicke Billig & Czaja PLLC

(57) ABSTRACT

An ion writing system includes a writing unit and a calibration module. The writing unit includes an array of selectable electrode nozzles to direct ions onto passive e-paper to form a pattern of dots on the e-paper. The calibration module calibrates the writing unit for image optical intensity via information from a sensor.

15 Claims, 13 Drawing Sheets

(56) References Cited

U.S. PATENT DOCUMENTS

| | | |
|---|---|---|
| 6,515,790 B2 | 2/2003 | Miyamoto et al. |
| 6,982,734 B2 | 1/2006 | Pan |
| 7,140,550 B2 | 11/2006 | Ramachandran |
| 7,580,845 B2 | 8/2009 | Burman et al. |
| 7,602,411 B2 | 10/2009 | Wakasugi |
| 7,728,994 B2 | 6/2010 | Fujimori et al. |
| 8,144,388 B2 | 3/2012 | Ogawa |
| 8,378,702 B2 | 2/2013 | Boudreau et al. |
| 8,514,256 B2 | 8/2013 | Ogawa et al. |
| 8,625,179 B2 | 1/2014 | Sakatani |
| 2002/0080396 A1* | 6/2002 | Silverbrook ......... B41J 2/17513 358/1.15 |
| 2003/0067427 A1 | 4/2003 | Comiskey et al. |
| 2004/0252182 A1 | 12/2004 | Wakasugi |
| 2005/0079386 A1* | 4/2005 | Brown, Jr. ............. B82Y 10/00 428/690 |
| 2005/0134550 A1 | 6/2005 | Schmitz |
| 2005/0202804 A1* | 9/2005 | Silverbrook ......... B41J 2/17503 455/411 |
| 2005/0213127 A1* | 9/2005 | Hoshino ................. H04N 1/58 358/1.9 |
| 2005/0213805 A1* | 9/2005 | Blake ..................... G06K 9/036 382/137 |
| 2006/0017659 A1 | 1/2006 | Ogawa et al. |
| 2007/0045399 A1 | 3/2007 | Martin |
| 2008/0124123 A1* | 5/2008 | Masuda ............... G03G 15/161 399/135 |
| 2009/0196485 A1* | 8/2009 | Mueller ................. G06K 9/036 382/137 |
| 2010/0039671 A1* | 2/2010 | Matusik ................ B41J 2/2132 358/2.1 |
| 2010/0149582 A1* | 6/2010 | Silverbrook ............ B41J 3/445 358/1.14 |
| 2011/0298760 A1 | 12/2011 | Gila et al. |
| 2012/0050816 A1* | 3/2012 | Plante ................ H04N 1/32235 358/3.06 |
| 2012/0193551 A1* | 8/2012 | Christophersen ......... H01J 3/14 250/397 |
| 2012/0206341 A1 | 8/2012 | Gila et al. |
| 2012/0320001 A1 | 12/2012 | Gila et al. |
| 2013/0003162 A1 | 1/2013 | Leoni et al. |
| 2013/0082109 A1* | 4/2013 | Meier ................. G06K 7/10722 235/462.41 |
| 2013/0235446 A1 | 9/2013 | Leoni et al. |
| 2014/0210805 A1 | 7/2014 | Birecki et al. |
| 2014/0239068 A1 | 8/2014 | Park |
| 2014/0253426 A1 | 9/2014 | Leoni et al. |
| 2017/0352321 A1* | 12/2017 | Hodges ................... G09G 3/38 |

* cited by examiner

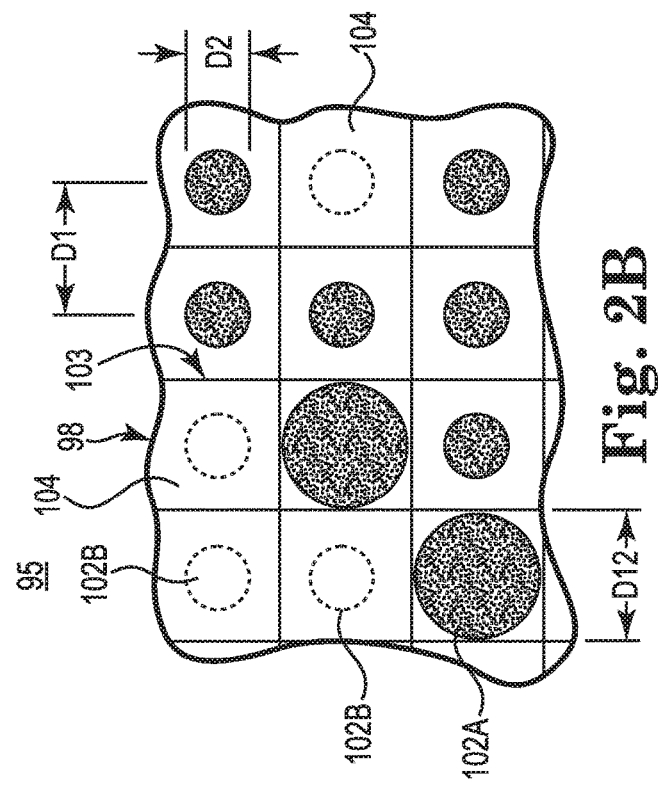
Fig. 1B
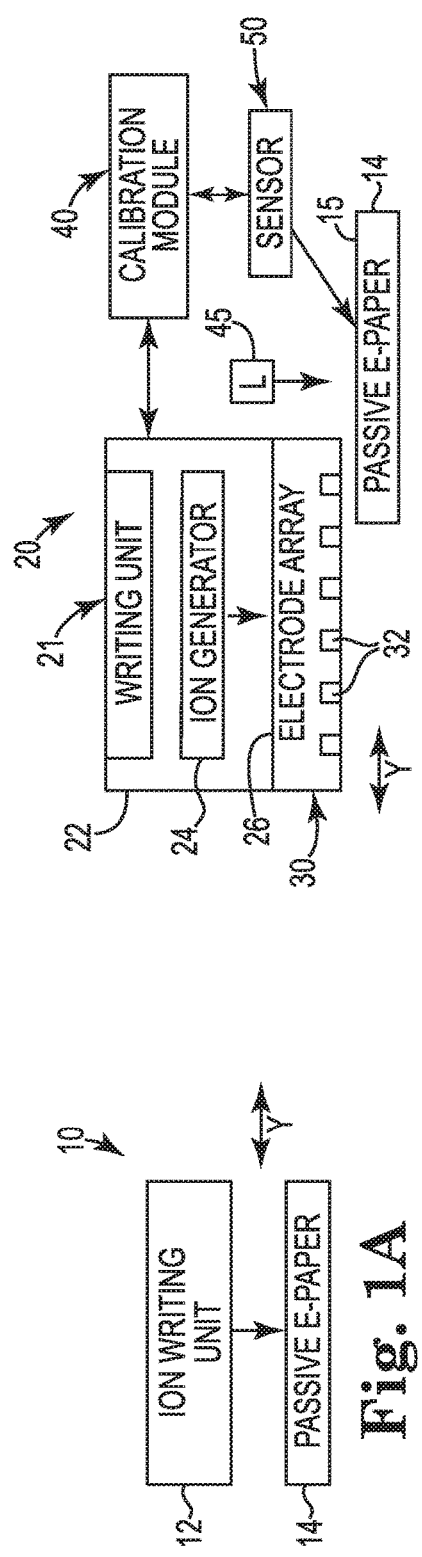
Fig. 1A
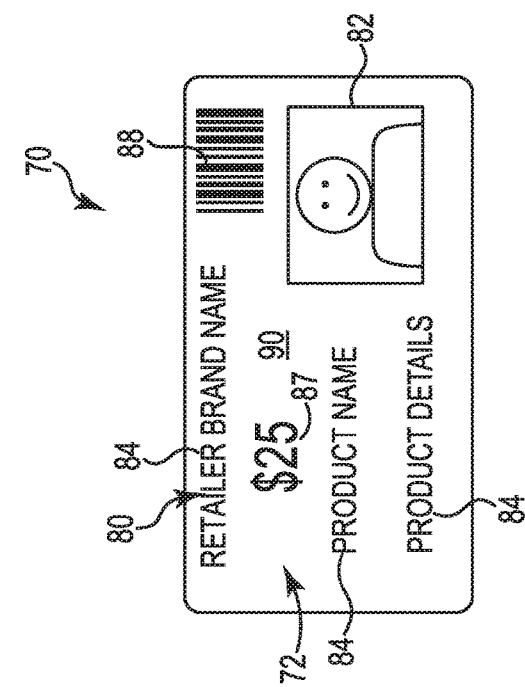
Fig. 2B
Fig. 2A

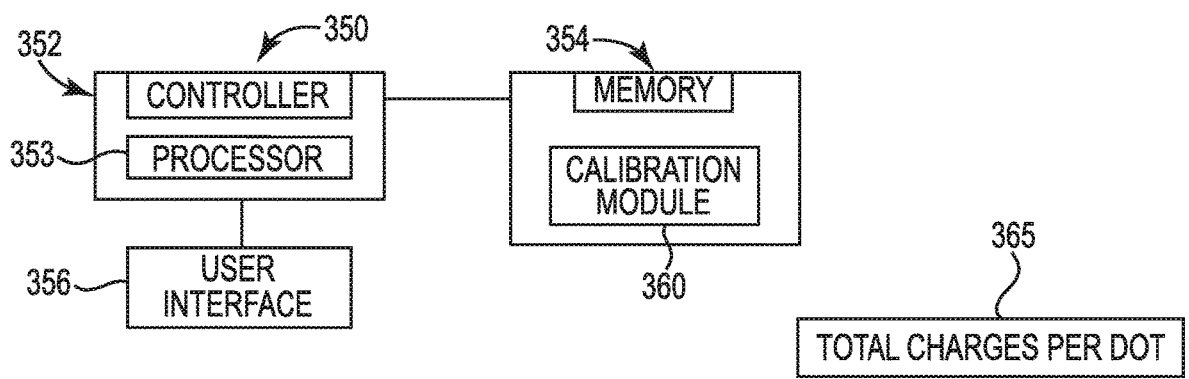
Fig. 8A
Fig. 8B
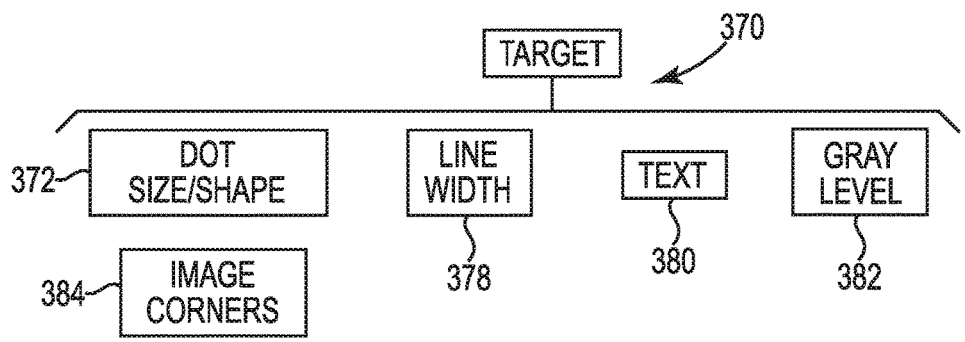
Fig. 9A
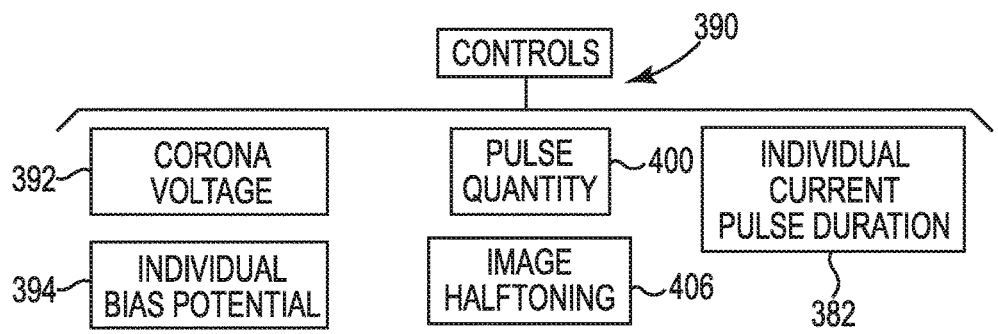
Fig. 9B
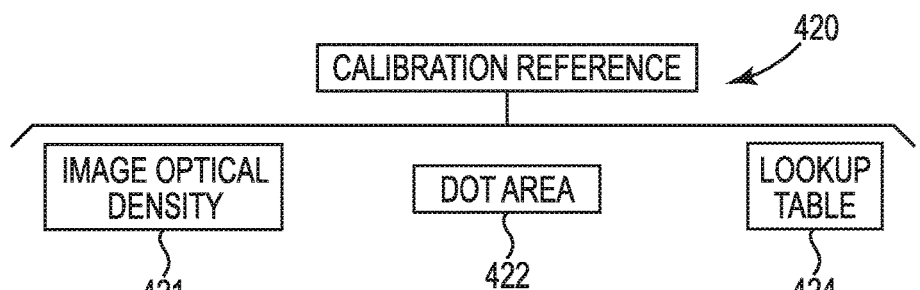
Fig. 9C

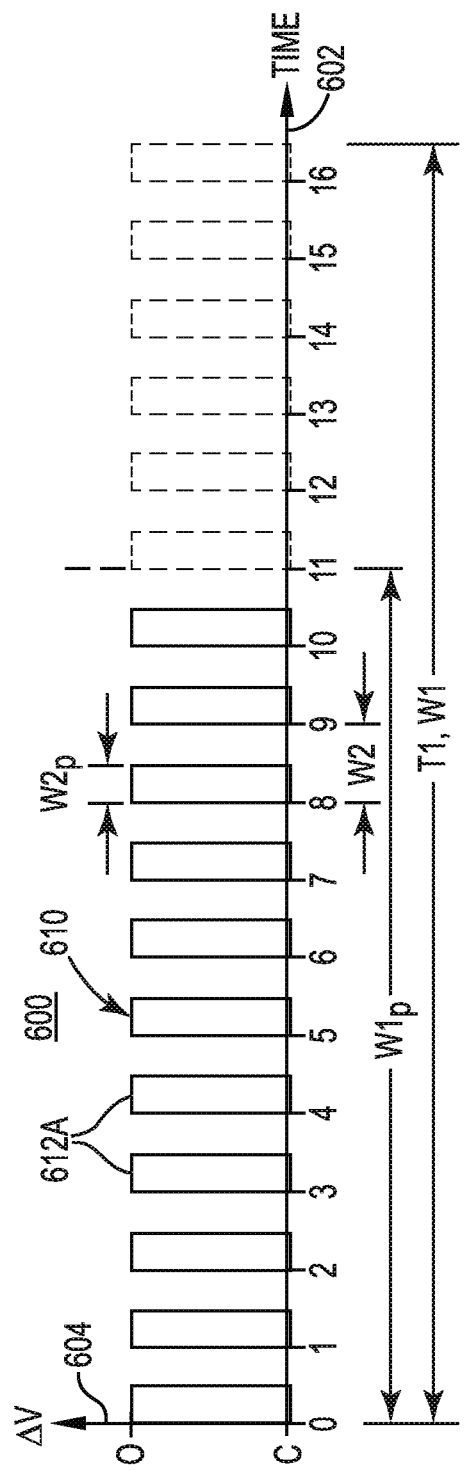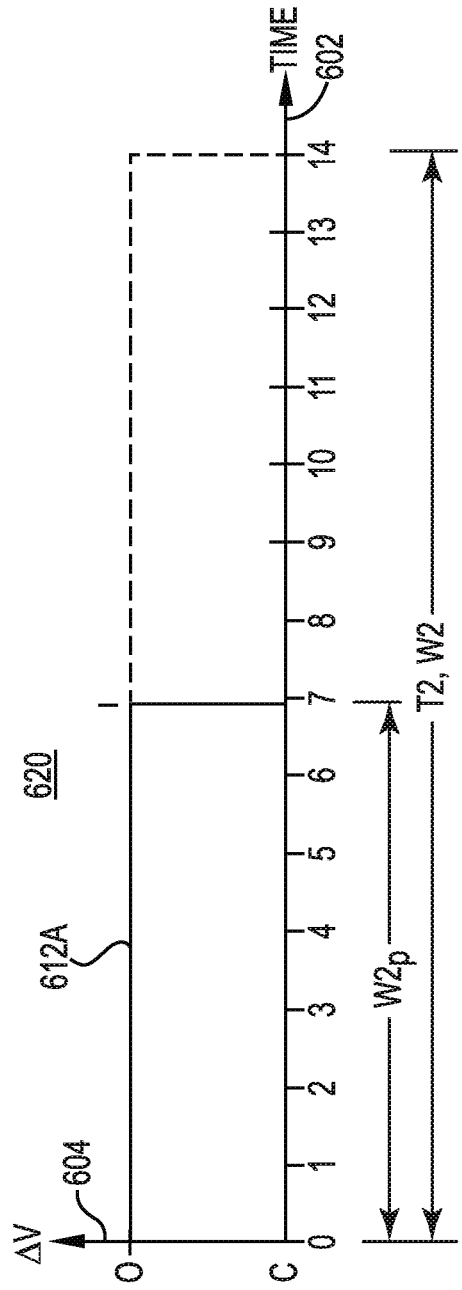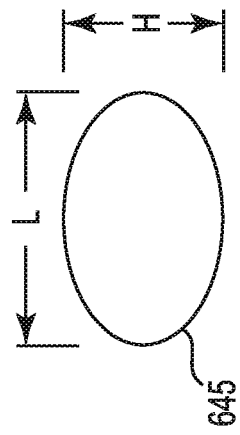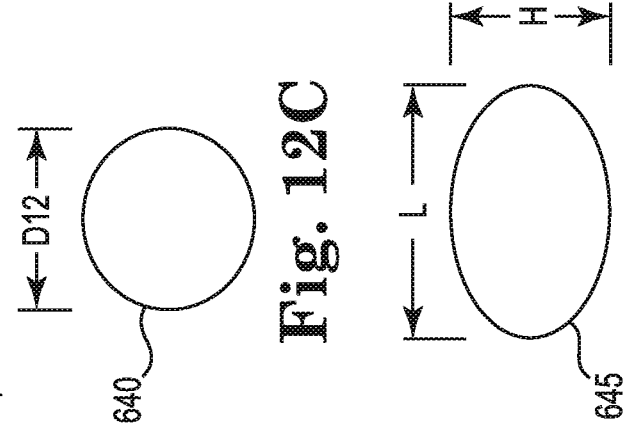

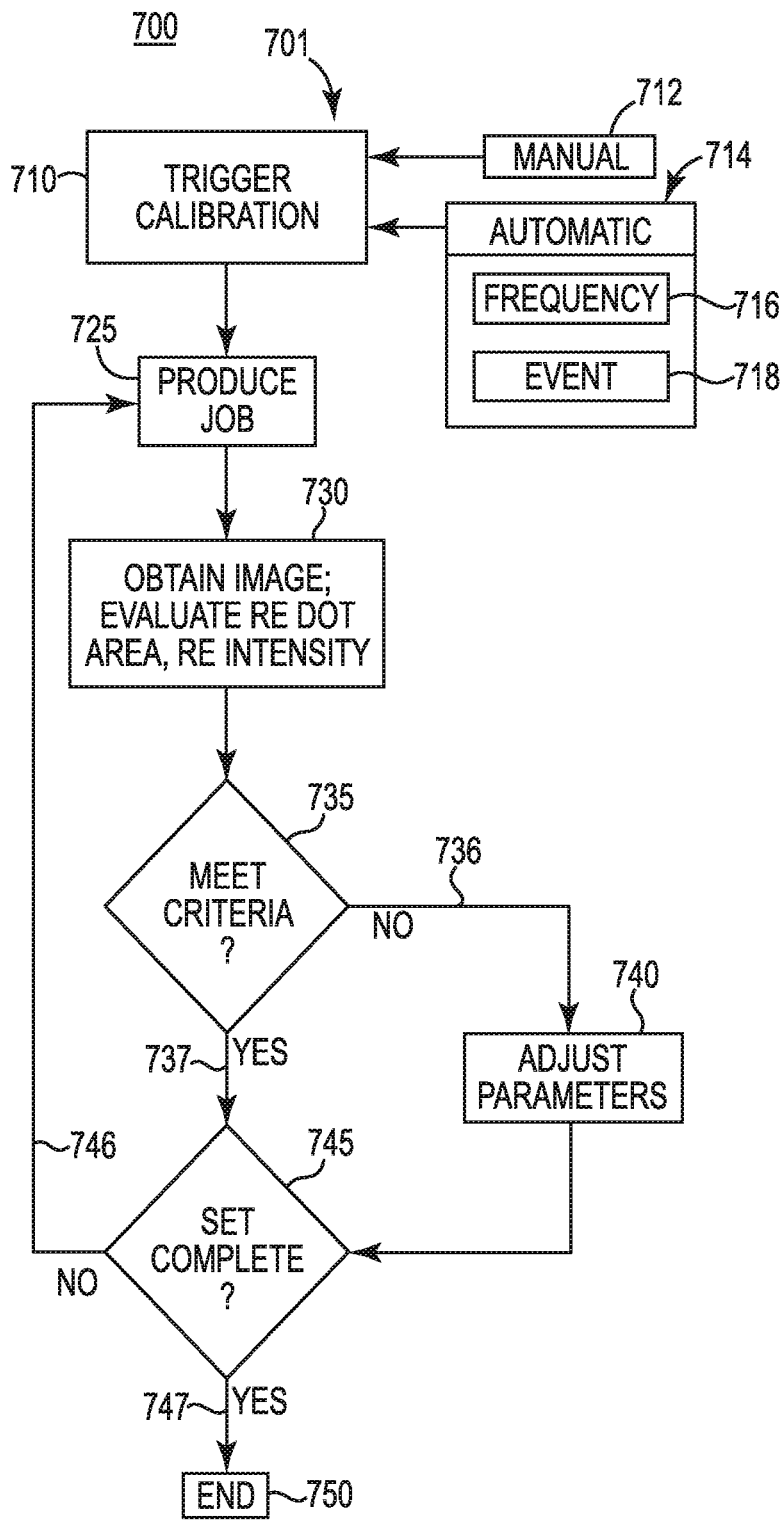
Fig. 13A
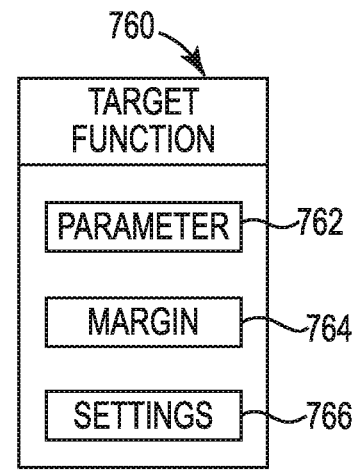
Fig. 13C
Fig. 13B

ION WRITING CALIBRATION

BACKGROUND

Electronic paper ("e-paper") is a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

BRIEF DESCRIPTION OF THE DRAWINGS

FIG. 1A is a block diagram schematically illustrating an ion writing unit for imaging passive e-paper, according to one example of the present disclosure.

FIG. 1B is a block diagram schematically illustrating an ion writing system including a calibration module, according to one example of the present disclosure.

FIG. 2A is a top elevational view schematically representing a display media, according to an example of the present disclosure.

FIG. 2B is a diagram including a top view schematically representing a dot-by-dot portion of content written by an ion writing unit, according to an example of the present disclosure.

FIG. 8A is a block diagram schematically illustrating a control portion, according to one example of the present disclosure.

FIG. 8B is a block diagram schematically illustrating a total charges per dot parameter, according to one example of the present disclosure.

FIG. 9A is a block diagram schematically illustrating a target function of a calibration module, according to one example of the present disclosure.

FIG. 9B is a block diagram schematically illustrating a controls function of a calibration module, according to one example of the present disclosure.

FIG. 9C is a block diagram schematically illustrating a calibration reference function of a calibration module, according to one example of the present disclosure.

FIG. 12A is a diagram including a graph schematically illustrating a set of current pulses generated by an ion writing unit, according to one example of the present disclosure.

FIG. 12B is a diagram including a graph schematically illustrating one current pulse generated by an ion writing unit, according to one example of the present disclosure.

FIGS. 12C and 12D are diagrams schematically illustrating a change in a size/shape of a dot.

FIG. 13A is a flow diagram schematically illustrating at least some aspects of calibrating an ion writing unit, according to one example of the present disclosure.

FIG. 13B is a block diagram schematically illustrating a criteria function, according to one example of the present disclosure.

FIG. 13C is a block diagram schematically illustrating a target function, according to one example of the present disclosure.

DETAILED DESCRIPTION

Figure 3C:
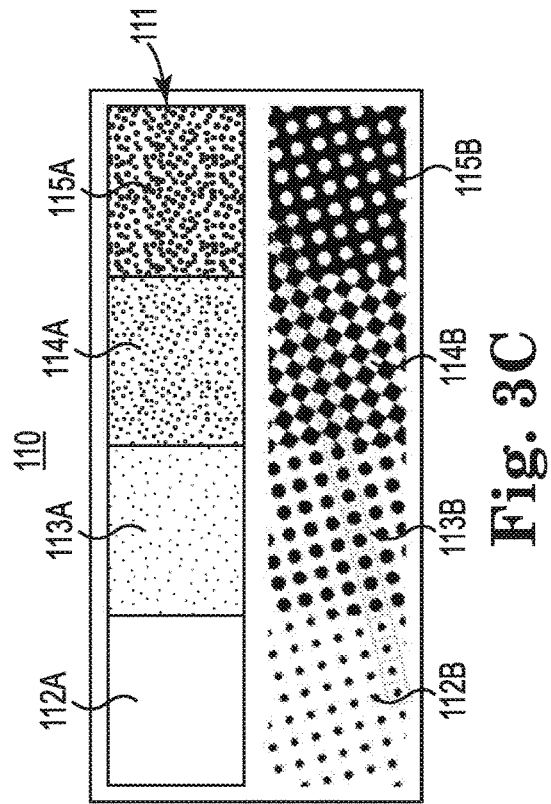
FIG. 3C is a diagram schematically illustrating gray level patterns in association with halftone patterns, according to one example of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense.

At least some examples of the present disclosure are directed to calibrating an ion writing unit for forming images on passive e-paper to thereby enhance the quality and consistency of formed images under varying conditions and uses of an ion writing unit.

In some examples, an ion writing system (i.e. assembly) includes a writing unit and a calibration module. The writing unit includes an array of selectable electrode nozzles to direct ions onto passive e-paper to form a pattern of dots on the e-paper. The calibration module calibrates the writing unit for image optical intensity via information from a sensor.

In some examples, image optical intensity represents the light intensity and light pattern attributes reflected from the image to the observer (or a dedicated sensor) as a result of a halftone pattern, image type, or image detail and the amount of light absorbed from full image coverage areas, which relates to the number of pigments and how well they are distributed on the media. In some examples, image optical intensity includes, but is not limited to parameters such as optical density.

In some examples, an ion writing system is calibrated to account for various factors, such as but not limited to, spatial variations (e.g. left, right side of image), time variations (e.g. day to day drift), variations between different ion writing units. Additional factors include, but are not limited to, non-uniformities in an individual ion writing unit, variations in the spacing between the ion writing unit and the passive e-paper (e.g. D5 in FIGS. 5-6B), aging, and environmental changes (e.g. temperature, humidity, altitude, etc.).

Via at least some examples of the present disclosure, calibration of an ion writing unit overcomes these variances and factors to maintain consistency and quality in writing images to passive e-paper.

These examples, and additional examples, are further described and illustrated in association with at least FIGS. 1A-15.

FIG. 1A is a block diagram schematically illustrating an ion writing unit 12 for causing image formation on passive e-paper 14, according to one example of the present disclosure. As shown in FIG. 1A, the ion writing unit 12 and passive e-paper 14 are capable of movement relative to each other during such image formation, as represented via directional arrow Y. In one aspect, the ion writing unit directs air-borne charges (e.g. charged ions) in a directed pattern onto a content-writable surface (i.e. imaging surface) of the passive e-paper, which responds by switching colored particles based on the location of the received charges. In one aspect, the e-paper media is passive in the sense that it is re-writable and holds written content without being connected to an active power source during the writing process and/or after the writing is completed. In another aspect, the e-paper media lacks internal circuitry and does not have an internal power supply.

In at least some examples, the e-paper media includes a charge-responsive layer that includes components that switch colors when a field or charges are applied to it. In some examples, the e-paper includes the charge-responsive layer and a conductive layer that serves as a counter-electrode on one side of the e-paper. In some examples, the color-switching components within the charge-responsive layer include pigment/dye elements, which are contained in microcapsules present in a resin/polymer material. In some examples, an additional functional coating is included on top of the charge-responsive layer.

In some examples, the electrode array comprises a two-dimensional array of individually addressable nozzles to provide high speed directing of charges while the various nozzles are strategically patterned (e.g. location and spacing) to prevent crosstalk between nozzles or unwanted charge deposition patterns on the imaging substrate (e.g. e-paper media) that would otherwise hamper quality imaging. Further details regarding these structures are described later in association with at least FIGS. 4-7B.

At least some examples of the present disclosure are directed to calibrating the ion writing unit 12 for image optical intensity for best image quality and best image consistency.

FIG. 1B is block diagram of an ion writing assembly 20 including an ion writing unit 21 and a calibration module 40, according to one example of the present disclosure. In one example, ion writing unit 21 includes at least substantially the same features and attributes as ion writing unit 12 in FIG. 1A.

As shown in FIG. 1B, the ion writing unit 21 includes a housing 22 containing and at least partially enclosing an ion generator 24. An electrode array 30 is located at one exterior portion 26 of the housing 22. The electrode array 30 includes an array of ion passage nozzles 32, which are selectively activatable to be open or closed with open nozzles allowing the passage of ions therethrough and closed nozzles blocking the passage of ions, as further described later in association with at least FIGS. 4-7B. The ion generator 24 is positioned within housing 22 to be spaced apart from electrode array 30.

In some examples, calibration module 40 receives information from a sensor 50 regarding image optical intensity at a surface 15 of the e-paper 14.

In some examples, the sensor 50 forms part of the ion writing assembly 20 and is coupled to at least one of the ion writing unit 21 or the calibration module 40. In some examples, the sensor 50 is at least partially supported by or contained by the same housing 22 that supports and/or at least partially contains the ion writing unit 21.

In some examples, the sensor 50 is external to the ion writing unit 21 and/or the calibration module 40.

In some examples, a light source (L) 45 is associated with sensor 50 and is provided to direct light onto surface 15 of e-paper 14 to enable the sensor to sense reflectance of the image on surface 15 of e-paper 14.

Further details regarding at least some features of sensor 50 further are described later in association with at least FIGS. 3A-3B.

While not shown as a separate sensor, in some examples current sensing and/or voltage sensing is provided at the nozzles 32 of electrode array 30 for use in calibration according to various current-related and/or voltage-related parameters, as described throughout the examples of the present disclosure.

FIG. 2A is top plan view schematically representing a portion of an e-paper display media 70, according to an example of the present disclosure. As shown in FIG. 2A, display media 70 includes content-viewable face 72.

As further described below in more detail, in some examples, the e-paper display media 70 incorporates e-paper structure like e-paper structure 204 as later described in association with at least FIGS. 6A-6B. In some examples, the content-viewable surface 72 corresponds to a content-writing surface of the e-paper display media 70 while in some examples, the content-viewable surface corresponds to a non-writable surface of the e-paper display media 70.

As shown in FIG. 2A, in some examples e-paper display media 70 bears content 80. In some examples, content 80 includes image 82, text 84, 87 and/or graphics 88 positioned among the remaining blank portion 90. In some examples, image 80 includes, but is not limited to, a graphical representation or photo of a person, object, place, symbol, icon, etc. Moreover, the particular content of the information in content 82 is not fixed, but is changeable by virtue of the rewritable nature of the e-paper structure incorporated within display media 70. In one example, a location, shape, and/or size of image 82, text 84 and/or graphics 88 of content 80 is also not fixed, but is changeable by virtue of the rewritable nature of the e-paper display media 70.

In at least some examples of the present disclosure, an e-paper structure forming at least a portion of display media 70 is a passive e-paper display. In one aspect, the e-paper display 70 is passive in the sense that it is re-writable and holds viewable content without being connected to an active power source during the writing process and/or after the writing is completed. Instead, the passive e-paper structure is imaged in a non-contact manner in which the e-paper display 70 receives charges (emitted by a ion head) that travel through the air and then forms viewable content 80 via a response by charged particles within a charge-responsive layer of the e-paper structure. After the imaging process is completed, the passive e-paper display 70 retains the viewable content generally indefinitely and without a power supply until content 80 is selectively changed at a later time. In some cases, media 70 is connected to ground.

In some examples, an e-paper structure forming display media 70 (and which includes a charge-receiving layer) is not strictly limited to the particular type of charge-responsive layer described later in association with at least FIGS. 6A-6B. Rather, in some examples, the charge-responsive layer forming an e-paper assembly (onto which a charge-receiving layer according to at least some examples of the present disclosure) operates at least consistent with general electrophoretic principles. With this in mind, in some examples, such charge-responsive layers include charged color particles (other than the microcapsules in FIGS. 6A, 6B) that switch color when charges are selectively applied a non-contact manner by an external writing module. In some examples, the charged color particles comprise pigment/dye components.

In some examples, display media 70 comprises a transaction card, such as an information transaction card, such as an identification badge, access badge, security badge, etc. In some examples, display media 70 comprises a financial transaction card, such as a credit card, debit card, etc. and through which transactions may take place.

With further reference to FIG. 2A, in some examples, content 80 appearing on face 72 of display media 70 results from writing the content at resolution of 300 dots-per-inch. In some examples, content 80 is written at greater or less resolutions than 300 dots-per-inch.

With this in mind, FIG. 2B is a diagram 95 including a top plan view of a portion 98 of content 80 on e-paper as written by an ion writing unit, according to one example of the present disclosure. As shown in FIG. 2B, diagram 95 includes a layout of dots 102A, each of which can be written based on a response of the underlying e-paper structure to deposited charges selectively targeted in a manner corresponding to the pattern of the intended content 80. As shown in FIG. 2B, the portion 98 of image 80 includes dots 102A. Meanwhile, locations 102B (each marked via a dotted circular line) correspond to locations which could be "marked" (but which are not marked) via an ion writing unit. Unmarked or unwritten dot locations 102B appear as part of blank portion 90 in content 80 shown in FIG. 2A, while the black dots 102A appear as a portion of image 82, text 84, graphic 88, etc. depending upon the location with which portion 98 corresponds. It will be understood that each dot 102A can be written within a full range of gray levels between white and black, and that dots 102A are shown as partially black for illustrative purposes.

Moreover, as shown by the different diameter dots 102A (e.g. D2 or D12) in FIG. 2B, dots 102A are selectively variable in size, and as later further described, in some examples, dots 102A vary in shape.

In FIG. 2B, a center-to-center spacing between dots 102 is represented by distance D1 while a diameter of each dot 102 is represented by distance D2. In some examples, to achieve a 300 dpi image, the distance D1 is 84 microns and the diameter (D2) of each dot 102 is about 80 to 100 microns.

Figure 6A:
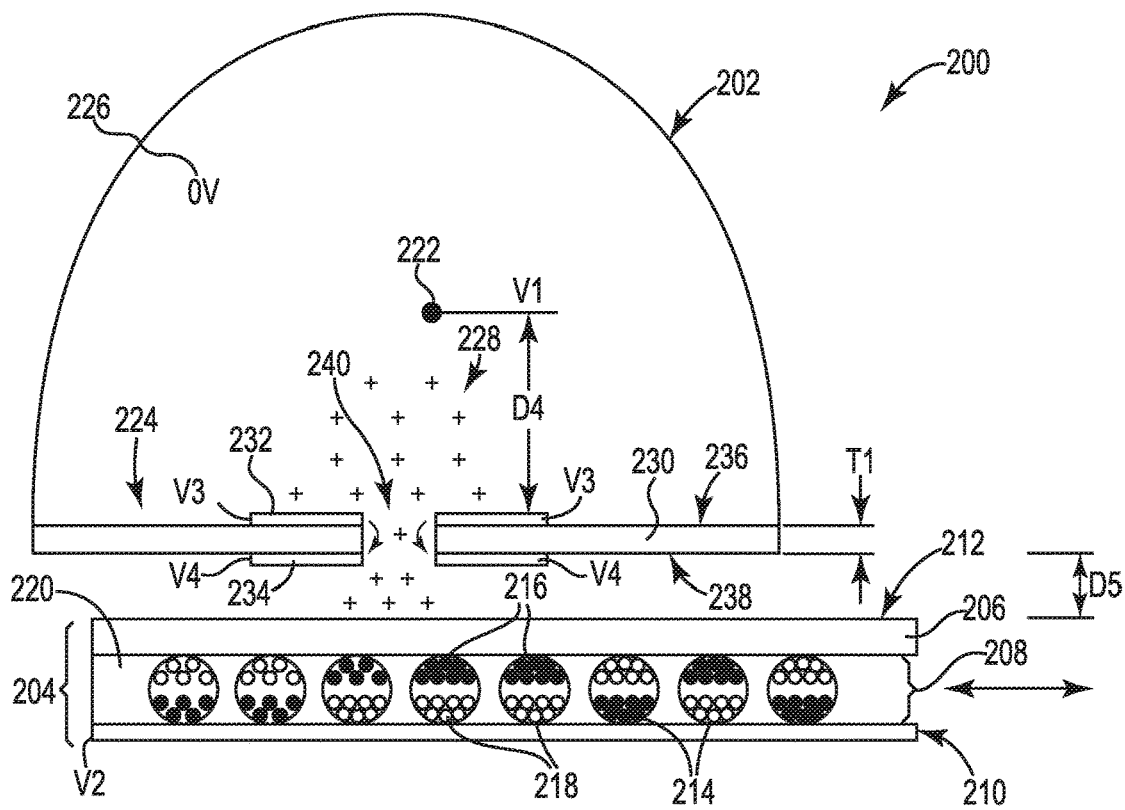
FIG. 6A is a diagram illustrating the operation of an ion writing unit in the "on" state, according to one example of the present disclosure.
Figure 6B:
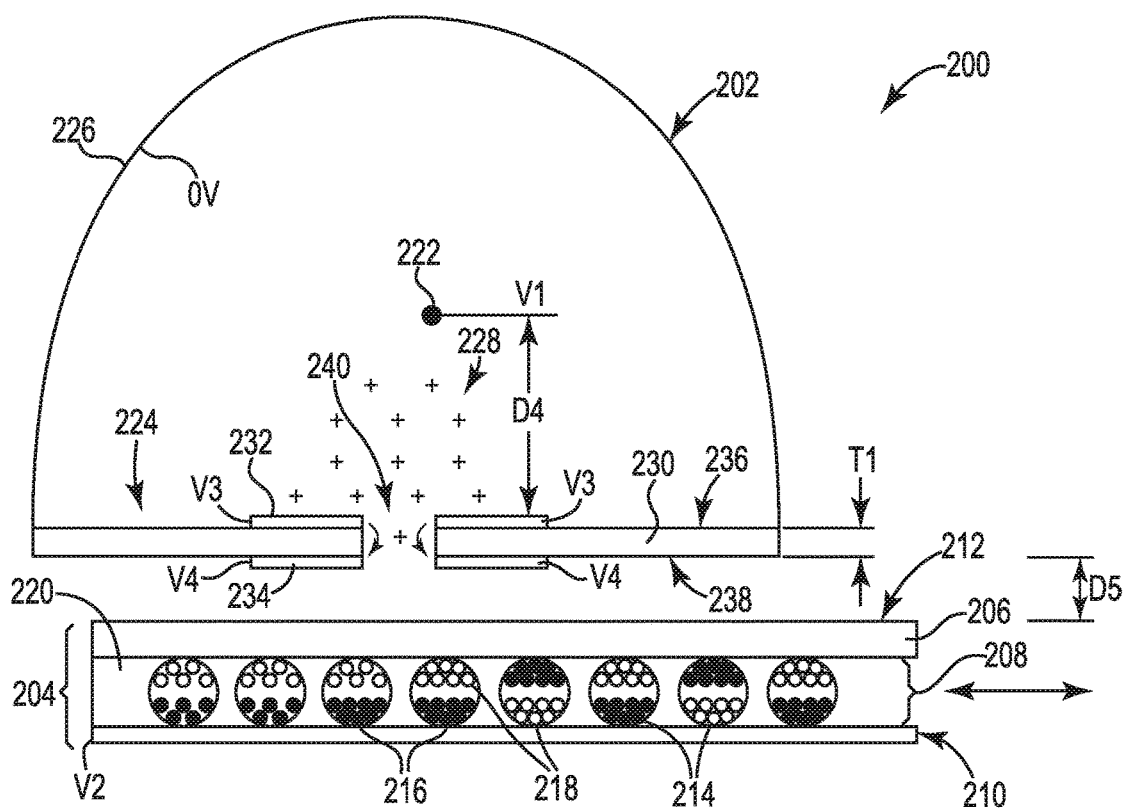
FIG. 6B is a diagram illustrating the operation of an ion writing unit in the "off" state, according to one example of the present disclosure.

With this in mind, in some examples, a size of the black dot 102A in content 80 in FIG. 2B typically corresponds to a combined size (e.g. area) of several (e.g. 3-4) microcapsules in a charge-responsive layer of an e-paper structure, as represented by microcapsules 214 in a charge-responsive layer 208 in e-paper structure 204 shown in at least FIGS. 6A-6B.ia In some examples, grid 103 corresponds with an array of pixel locations 104 at which dots 102A can be separately written via nozzles of an electrode array of an ion writing unit. Moreover, it will be further understood that, while an ion writing unit can selectively determine a size/shape of each written dot 102A, the pixel locations 104 in some instances are referred to in more generic terms as dots or pixels regarding their potential of being written or filled.

Figure 2C:
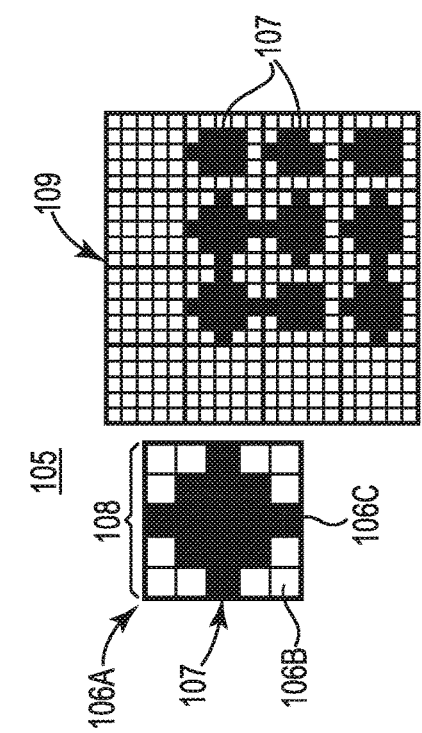
FIG. 2C schematically illustrates a pixel diagram, according to one example of the present disclosure.

With this in mind, FIG. 2C provides a diagram 105 schematically illustrating such pixel locations in a larger context relative to some commonly used terminology, particularly in the context of halftoning. As shown in FIG. 2C, a halftone cell 108 is made of a grid of writable pixel locations or spots 106B (i.e. a pixel location 104 in FIG. 2B) with element 106C representing a written pixel or dot, such as 102A in FIG. 2B. The larger grouping 107 of such written pixels 106C comprises a halftone dot. Meanwhile, FIG. 2C further illustrates a recorder grid 109A including nine halftone dots 107 of varying shapes/sizes.

Figure 3B:
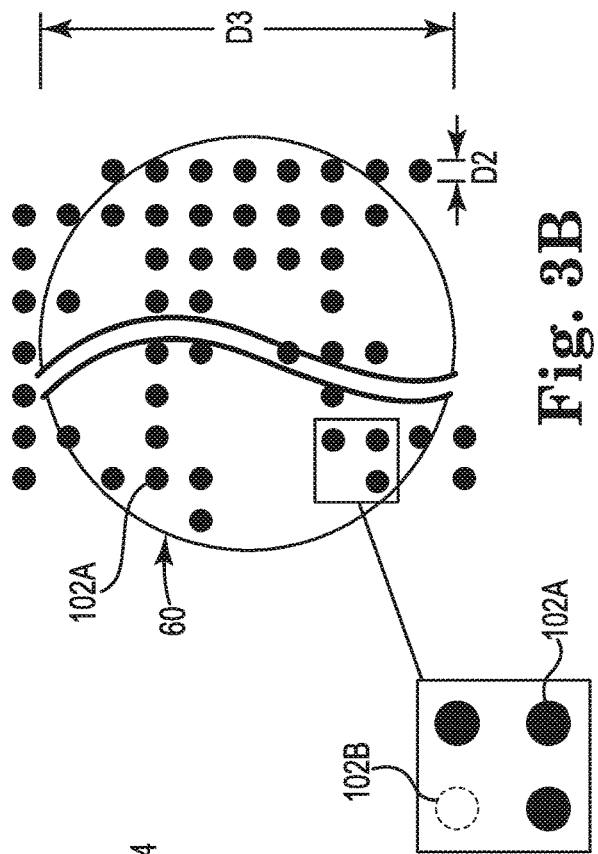
FIG. 3B is a diagram schematically illustrating a field of view of a measurement window of a sensor, according to one example of the present disclosure.
Figure 3A:
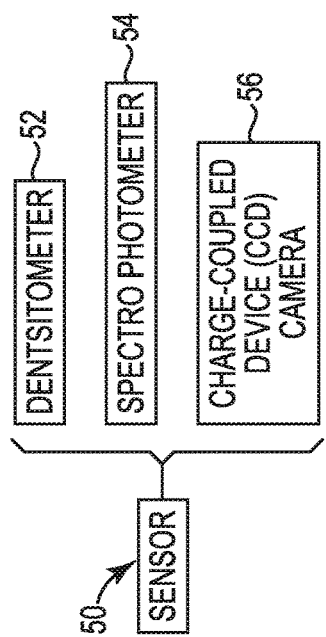
FIG. 3A is a block diagram schematically illustrating different sensor modalities, according to one example of the present disclosure.

FIG. 3A is a block diagram schematically illustrating a sensor 50, according to one example of the present disclosure, forming part of the ion writing assembly 20 of FIG. 1B. In general terms, sensor 50 includes at least one imaging mechanism to obtain a sample image of a portion of an e-paper structure to determine an image optical intensity. Accordingly, in some examples, sensor 50 is an optical sensor. In some examples, sensor 50 comprises a densitometer 52. In some examples, sensor 50 comprises a spectrophotometer 54, through which Lab color values are obtained. In some examples, sensor 50 comprises a charge-coupled device (CCD) camera 56.

FIG. 3B is a diagram schematically illustrating a field of view 60 of sensor 50, according to one example of the present disclosure. As shown in FIG. 3B, field of view 60 defines a discrete (i.e. fixed) area. While the field of view 60 shown in the example of FIG. 3B is generally circular, in some examples the field of view 60 has other shapes such as rectangular.

In some examples, the field of view 60 of a commercially available sensor 60 comprises an area of about 3 to 4 millimeters used to determine an image optical intensity for a given percent dot area. This is equivalent to about 3000 to 4000 microns, while in some examples the size of each dot 102A in FIGS. 2B, 3B) is about 100 microns. Accordingly, it will be understood that FIG. 3B is not necessarily to scale but arranged for illustrative purposes. For instance, as shown in FIG. 3B, the field of view 60 of sensor 50 has a diameter D3 while each "imageable" dot 102A has a diameter (D2). However, during calibration, each dot 102A in the field of view 60 typically has a larger diameter (such as D12 in FIG.

2B) to occupy a generally continuous area with adjacent dots 102A being in contact with each other, consistent with the manner of continuity among adjacent pixels/dots within a grouping 107 of halftone dots (i.e. pixel) demonstrated in FIG. 2C.

As noted above, in some examples, measurements of optical density are translated to image dot area. In some examples, a percentage dot area is expressed in the Murray-Davies equation in which an Apparent Dot Area=(1−10−(D(t)−D(b)))/(1−10−(D(s)−D(b)))×100,
Where D(t)=Density of the substrate tint,
Where D(s)=Density of solid, or D-Max, and
Where D(b)=Density of substrate base.

In some examples, in terms of expressing optical density on a scale, Reflection Density is expressed via the scale: log 10 1/R, as shown in Table 1 below:

TABLE 1

| % Reflectance | DENSITY |
|---|---|
| 100% | = 0.0 D |
| 10% | = 1.0 D |
| 1% | = 2.0 D |
| 0.1% | = 3.0 D |
| 0.01% | = 4.0 D |

Further details regarding the use of image optical density and dot are further described in the context of at least some of the examples associated with FIGS. 8-15.

FIG. 3C is a diagram 110, according to one example of the present disclosure, schematically illustrating a representation 111 of gray scale levels 112A, 113A, 114A, 115A relative respective patterns 112B, 113B, 114B, 115B of written dots.

In some examples, information from the tools provided via FIGS. 2A-3B is employed in use of the various parameters in the calibration pathways, as later described in association with at least FIGS. 9A-9D.

Figure 4:
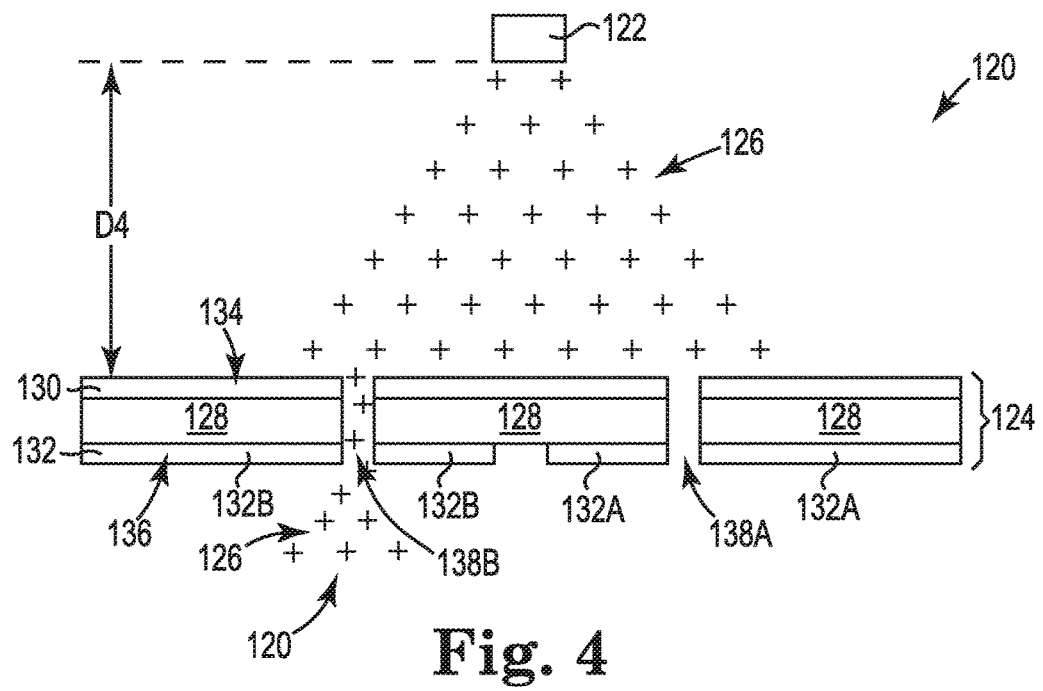
FIG. 4 is a diagram including a side sectional view schematically illustrating an ion writing unit, according to one example of the present disclosure.

FIG. 4 is a diagram schematically illustrating, in one example of the present disclosure, an ion writing unit 120 that can be used to write a marking material, such as e-paper. In some examples, the ion writing unit 120 comprises the ion writing unit 21, previously shown in FIG. 1B. Ion writing unit 120 includes a device 122 that generates charges and an electrode grid array 124. The term "charges" as used herein refers to ions (+/−) or free electrons and in FIG. 4 device 122 generates positive charges 126. Electrode array 124 is held in spaced apart relation to device 122 by a distance D4. In some examples, device 122 is a corona generating device, such as a thin wire that is less than 100 micrometers in diameter and operating above its corona generating potential. In some examples, while not shown in FIG. 7, device 122 generates negative charges that move under existing electrical fields.

In some examples, electrode array 124 includes a dielectric film 128, a first electrode layer 132, and a second electrode layer 130. Dielectric film 128 has a first side 134 and a second side 136 that is opposite first side 134. Dielectric film 128 has holes 138A and 138B that extend through dielectric film 128 from first side 134 to second side 136, with the respective holes acting as nozzles. In some examples, each of the holes 138A and 138B is individually addressable to control the flow of electrons through each of the holes 138A and 138B separately.

First electrode layer 132 is on first side 136 of dielectric film 128 and second electrode layer 130 is on second side 134 of dielectric film 128 such that dielectric film 128 is sandwiched between the two respective layers 132, 134. In some examples, second electrode layer 130 is a generally continuous electrode material and is formed around the circumferences of holes 138A and 138B to surround holes 138A and 138B on second side 134. First electrode layer 132 is formed into separate electrodes 132A and 132B, where electrode 132A is formed around the circumference of hole 138A to surround hole 138A on first side 136 and electrode 132B is formed around the circumference of hole 138B to surround hole 138B on first side 136.

In operation, an electrical potential between first electrode layer 132 and second electrode layer 130 controls the flow of charges 126 from device 122 through holes 138 in dielectric film 128. In some examples, electrode 132A is at a higher electrical potential than second electrode layer 130 and the positive charges 126 are prevented or blocked from flowing through hole 138A. In some examples, electrode 132B is at a lower electrical potential than second electrode layer 130 and the positive charges 126 flow through hole 138B to a collector (not shown).

Figure 5:
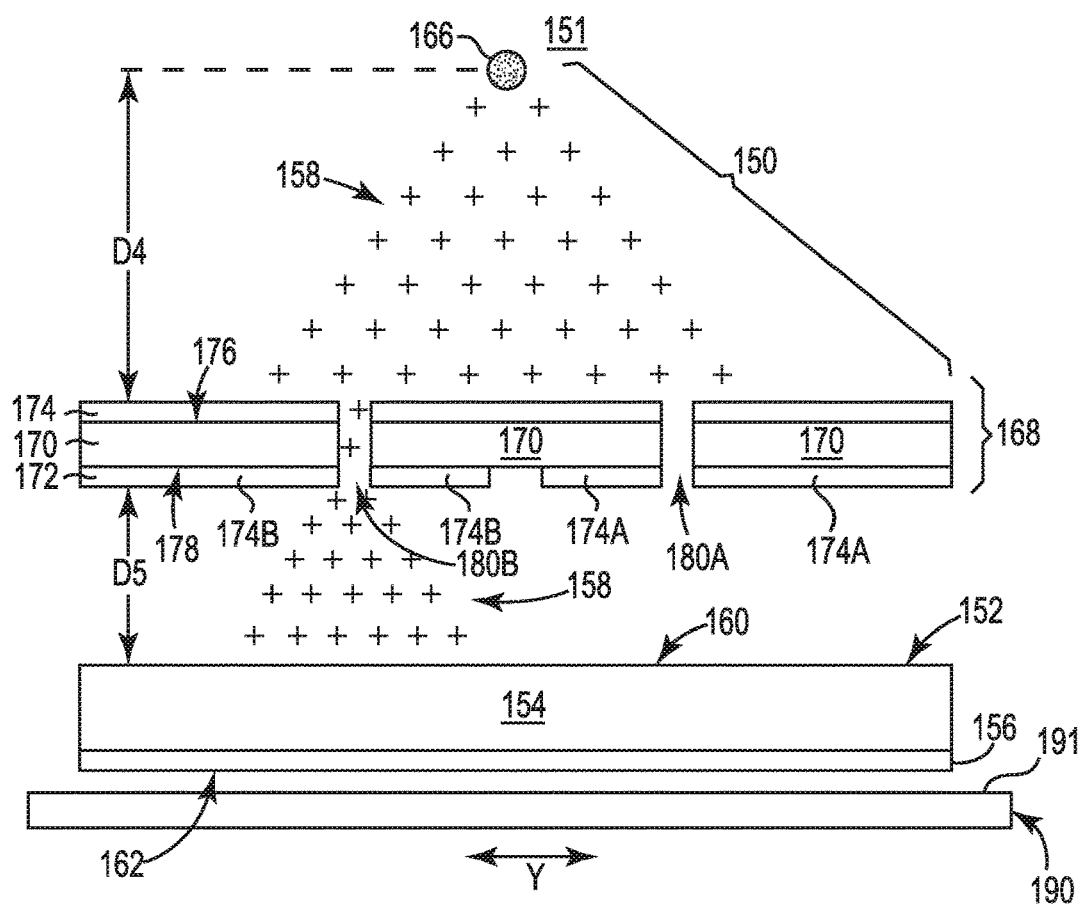
FIG. 5 is a diagram including a side sectional view illustrating an addressable ion writing unit for imaging e-paper, according to one example of the present disclosure.

FIG. 5 is a diagram schematically illustrating, in one example of the present disclosure, an ion writing unit 151 including an addressable corona, ion writing unit 150 for imaging e-paper 152. Ion writing unit 150 images digital media on e-paper 152 using positive or negative charges. E-paper 152 is bi-stable, such that a collection of light absorbing and light reflecting states across e-paper 152 remains until sufficient charges or electrical fields are applied to e-paper 152. In some examples e-paper 152 is a passive e-paper that does not include electronics for changing the state of the e-paper.

In general terms, ion writing unit 150 is held in spaced apart relation to e-paper 152 by a distance D5. In particular, as further shown in FIG. 5, in some examples the ion writing unit 151 includes a support 190 to releasably support e-paper 152 (at least during relative motion between ion writing unit 150 and e-paper 152) to enable e-paper 152 to position e-paper 152 to receive charge directed through holes 180A, 180B of ion writing unit 150. In one aspect, support 190 is arranged as part of a positioning mechanism that controls relative movement between ion writing unit 150 and support 190, as represented via directional arrow Y. In another aspect, a top surface 191 of support 190 is spaced from bottom surface of the electrode array (i.e. the location of holes 180A, 180B) by a distance D5.

In some examples, e-paper 152 includes charge-responsive layer 154 and a counter electrode layer 156. Charge-responsive layer 154 includes charged color components that switch colors when charges 158 are applied to the imaging surface 160 (i.e. the content writable surface) of e-paper 152. Counter electrode layer 156 is a conductive layer secured to charge-responsive layer 154 and is the non-imaging surface 162 of e-paper 152, which is opposite imaging surface 160 of e-paper 152. In some examples, an additional coating is included on charge-responsive layer 154 and this additional coating comprises an imaging surface 160 of e-paper 152. In some examples, the color-switchable components of charge-responsive layer 154 include pigment/dye elements with a resin or polymer encapsulating microcapsules containing the color-switchable components of charge-responsive layer 154. With further reference to FIG. 5, in some examples, ion writing unit 150 includes a corona generating device 166 (such as a corona wire) that generates charges and a non-charge generating addressable electrode grid array 168. In FIG. 5, corona generating device 166 generates positive charges 158, however, in some examples corona generating device 166 can generate positive or negative charges. Non-charge generating addressable electrode array 168 is held in spaced apart relation to corona generating device 166 by a distance D4. In some examples, corona generating device 166 is a thin wire that is less than 100 micrometers in diameter and operating above its corona generating potential, such as above 3 kilovolts. In some examples, corona generating device 166 is a thin wire, such as a 70 micrometer diameter tungsten wire coated with gold.

Non-charge generating addressable electrode array 168 provides spatially varying electric potential along the length of corona generating device 166 to selectively block or allow charges 158 to pass through addressable electrode array 168. The addressable electrode array 168 provides for temporal and spatial control of charges 158 onto e-paper 152.

Electrode array 168 includes a dielectric film 170, a first electrode layer 174, and a second electrode layer 172. Dielectric film 170 has a first side 178 and a second side 176 that is opposite first side 178. Dielectric film 170 has holes 180A and 180B that extend through dielectric film 170 from first side 178 to second side 176, with holes acting as nozzles. Each of the holes 180A and 180B is individually addressable to control the flow of electrons through each of the holes 180A and 180B separately.

First electrode layer 172 is on first side 178 of dielectric film 70 and second electrode layer 174 is on second side 176 of dielectric layer 70. Second electrode layer 174 is formed around the circumferences of holes 180A and 180B to surround holes 180A and 180B on second side 176. First electrode layer 172 is formed into separate electrodes 174A and 174B, where electrode 174A is formed around the circumference of hole 180A to surround hole 180A on first side 178 and electrode 174B is formed around the circumference of hole 180B to surround hole 180B on first side 178.

In operation, addressable corona generator 166 of ion writing unit 150 generates charges 158 that drift toward and through nozzles of the addressable electrode array 168 and then travel through the air for deposit onto e-paper 152 to selectively switch the optical state of the pigment/dye in e-paper 152. Imaging surface 160 of e-paper 152 is opposite conductive counter electrode 156 and a ground return path connected to counter electrode 156 provides a path for counter charges to flow to counter electrode 156, which keeps e-paper 152 substantially charge neutral in spite of charges 158 on imaging surface 160. In some examples, counter electrode 156 is at ground. In some examples, counter electrode 156 is at any suitable reference potential to provide the fields suitable to extract charges 158 from corona generating device 166.

Electric potential between first electrode layer 172 and second electrode layer 174 controls the flow of charges 158 from corona generating device 166 through holes 180A, 180B in dielectric film 170. In some examples, electrode 174A is at a higher electrical potential than second electrode layer 174 and the positive charges 158 are prevented or blocked from flowing through hole 180A. However, in some examples, electrode 174B is at a lower electrical potential than second electrode layer 174 and the positive charges 158 flow through hole 180B to e-paper 152.

FIGS. 6A and 6B are diagrams including a side sectional view schematically illustrating the operation of an ion writing unit 200, according to one example of the present disclosure, which includes an addressable corona ion writing unit 202 and e-paper 204. Ion writing unit 202 is held in spaced apart relation to e-paper 204 by a distance D5 with e-paper 204 and ion writing unit 202 arranged for relative movement with respect to each other such that ion writing unit 202 causes image formation on e-paper 104. While not shown in FIGS. 6A, 6B, it will be understood that in some examples, e-paper 204 is releasably supported by support 190, as in FIG. 5 with support 190 maintaining the spaced apart distance D5. In some examples distance D5 is 0.5 millimeters.

With this arrangement, ion writing unit 202 controls the temporal and spatial transference of positive charges onto e-paper 204 to provide digital media content on e-paper 204. E-paper 204 is bi-stable, such that e-paper 204 retains the written/viewable content until sufficient charges or electrical fields are applied to erase such content. In some examples e-paper 204 is passive e-paper that does not include electronics for changing the state of the e-paper.

It will be understood that while FIGS. 6A, 6B show just one hole 240 (i.e. nozzle), these Figures are representative of the operation of an electrode array having many such holes, with each hole being individually controllable in an "on" or "off" state.

In some examples, e-paper 204 includes a functional coating layer 206, a charge-responsive layer 208, and a counter electrode layer 210. Functional coating layer 206 is situated on one side of charge-responsive layer 208 and includes content writable surface 212. In some examples, charged components within charge-responsive layer 208 switch color when charges are applied to the content writable surface 212. Counter electrode layer 210 is a conductive layer on another side of charge-responsive layer 208, opposite functional coating layer 206. In one aspect, counter electrode layer 210 is the non-writable surface of e-paper 204, which is opposite content-writable surface 212.

In some examples, charge-responsive layer 208 includes capsules 214 containing a dispersion of charged color particles (e.g. pigment or dye) in dielectric oils. This dispersion of charged color particles includes black or dark, light absorbing, particles 216 and white, light reflecting, particles 218. A resin or polymer binder 220 encapsulates pigment capsules 214 of charge-responsive layer 208. In some examples, black particles 216 drift toward functional coating layer 206 and white particles 218 drift toward counter electrode layer 210 after positive charges are placed on content-writable surface 212. In some examples, white particles 218 drift toward functional coating layer 206 and black particles 216 drift toward counter electrode layer 210 after positive charges are placed on content-writable surface 212. It will be understood that an alternate paradigm is employable in which black particles 216 drift toward electrode layer 210 and white particles 218 drift toward functional coating layer 206 after positive charges are placed on content-writable surface 212.

In some examples, addressable ion writing unit 202 generates positive charges that are selectively applied to content-writable surface 212 to image digital media content on e-paper 204. A ground return path connected to counter electrode layer 210 provides a path for counter charges to flow to counter electrode layer 210, which keeps e-paper 204 substantially charge neutral in spite of the positive charges placed on content-writable surface 212. Counter electrode layer 210 is at any suitable reference potential to provide the appropriate fields to extract positive charges from addressable corona ion writing unit 202.

In some examples, ion writing unit 202 includes a corona wire 222, an addressable electrode grid array 224, and a housing 226. Electrode array 224 is held in spaced apart relation to corona wire 222 by a distance D4 and, in some examples, corona wire 222 operates at 3000-5000 volts to generate positive charges 228. In some examples, corona wire 222 is 70 micrometers in diameter. In some examples, corona wire 222 is a tungsten wire coated with gold. In some examples, distance D4 is 1.5 millimeters.

Electrode array 224 provides temporally and spatially varying electric potential along the length of corona wire 222 to selectively block or allow charges 228 to pass through electrode array 224 and onto e-paper 204.

In some examples, addressable electrode array 224 includes dielectric material 230, a first electrode layer 234, and a second electrode layer 232. Dielectric material 230 has a thickness T1 and a first side 238 and an opposite second side 236. Dielectric material 230 has a hole or nozzle 240 that extends through dielectric material 230 from first side 238 to second side 236. In some examples, thickness T1 is 50 micrometers.

First electrode layer 234 is on first side 238 and second electrode layer 232 is on second side 236. First electrode layer 234 is formed around the circumferences of hole 240 to surround hole 240 on first side 238 and second electrode layer 232 is formed around the circumference of hole 240 on second side 236.

FIG. 6A is a diagram schematically illustrating, in one example of the present disclosure, the operation of ion writing unit 202 in the "on" state, where positive charges 228 are transferred from ion writing unit 202 to content writable surface 212, which is sometimes referred to as the collector electrode. In some examples, corona wire 222 is held at 3000-8000 volts (as represented by V1) to generate positive charges 228 and housing 226 is held at 0 volts (ground). Second electrode layer 232 is held at an intermediate potential (represented by V3) in a range between V1 and V2. In some examples, V3 is computed as V3=V2+α(V2−V1), where is α a number between 0 and 1 representing a fraction of the overall ΔV between V1 and V2, with typical values for α ranging from 0.65 to 0.75 depending on the geometry and causing positive charges 228 drift from corona wire 222 to electrode array 224 and second electrode layer 232. First electrode layer 234 is switched to and held at a negative potential (represented by V4) relative to the second electrode and positive charges 228 pass through hole 240 in dielectric material 230 biased by the electric field between second electrode layer 232 and first electrode layer 234.

In one aspect, the e-paper 204 is electrically biased with the collector electrode of e-paper 204 being held at a negative potential in the range of 500 to 4000 volts (represented by V2), which pulls positive charges 228 that pass through hole 240 onto content writable surface 212. The positive charges 228 on content writable surface 212 bias particles, such as black particles 216, toward content writable surface 212 to provide digital media content on e-paper 204. In some examples, negative charges are used to bias suitably colored particles.

FIG. 6B is a diagram illustrating in some examples of the present disclosure the operation of ion writing unit 200 in the "off" state, where positive charges 228 from ion writing unit 202 are blocked by electrode array 224 from being transferred to content writable surface 212. In some examples, corona wire 222 is held at a potential in the range of 3000-8000 volts (represented by V1) to generate positive charges 228 and housing 226 is held at an intermediate potential between corona wire 222 and e-paper electrode 204. Second electrode layer 232 is held in the range between V1 and V2. In some example, V3 is computed as V3=V2+α(V2−V1), where is α a number between 0 and 1 representing a fraction of the overall ΔV between V1 and V2, with typical values for a range from 0.65 to 0.75 depending on the geometry and causing positive charges 228 drift from corona wire 222 to electrode array 224 and second electrode layer 232. However, first electrode layer 234 is switched to and held a potential difference (ΔV) with respect to the second electrode layer 232 in the range of 50-300 volts depending on the geometry, such that positive charges 228 are blocked from passing through hole 240 in dielectric material 230 by the electric field between first electrode layer 234 and second electrode layer 232.

In this situation, despite the e-paper 204 being electrically biased via the collector electrode of e-paper 204 being held at a large negative potential, the positive charges 228 do not pass through hole 240 and onto content writable surface 212. Particles, such as white particles 218, which may have been previously biased toward content writable surface 212 remain at that surface to provide digital media images on e-paper 204. In some examples, negative charges are used to bias suitably colored particles.

In some examples of ion writing unit 200, second electrode layer 232 is held at a positive potential difference with respect to the housing in both the on state and the off state, and first electrode layer 234 is switched between a negative potential and a positive potential to switch between the on state and the off state, respectively.

Figure 7A:
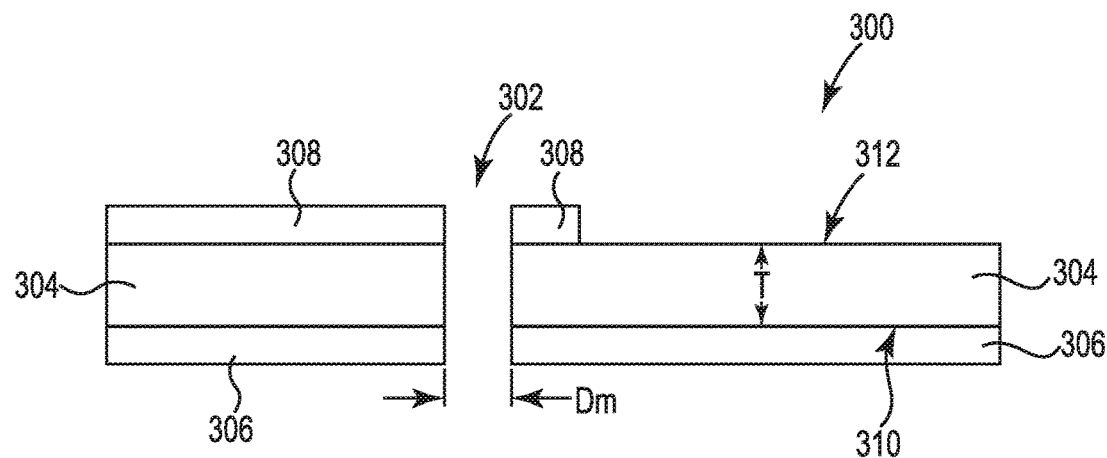
FIG. 7A is a diagram including a sectional view of an electrode array taken along the line 7A-7A in FIG. 7B, according to one example of the present disclosure.
Figure 7B:
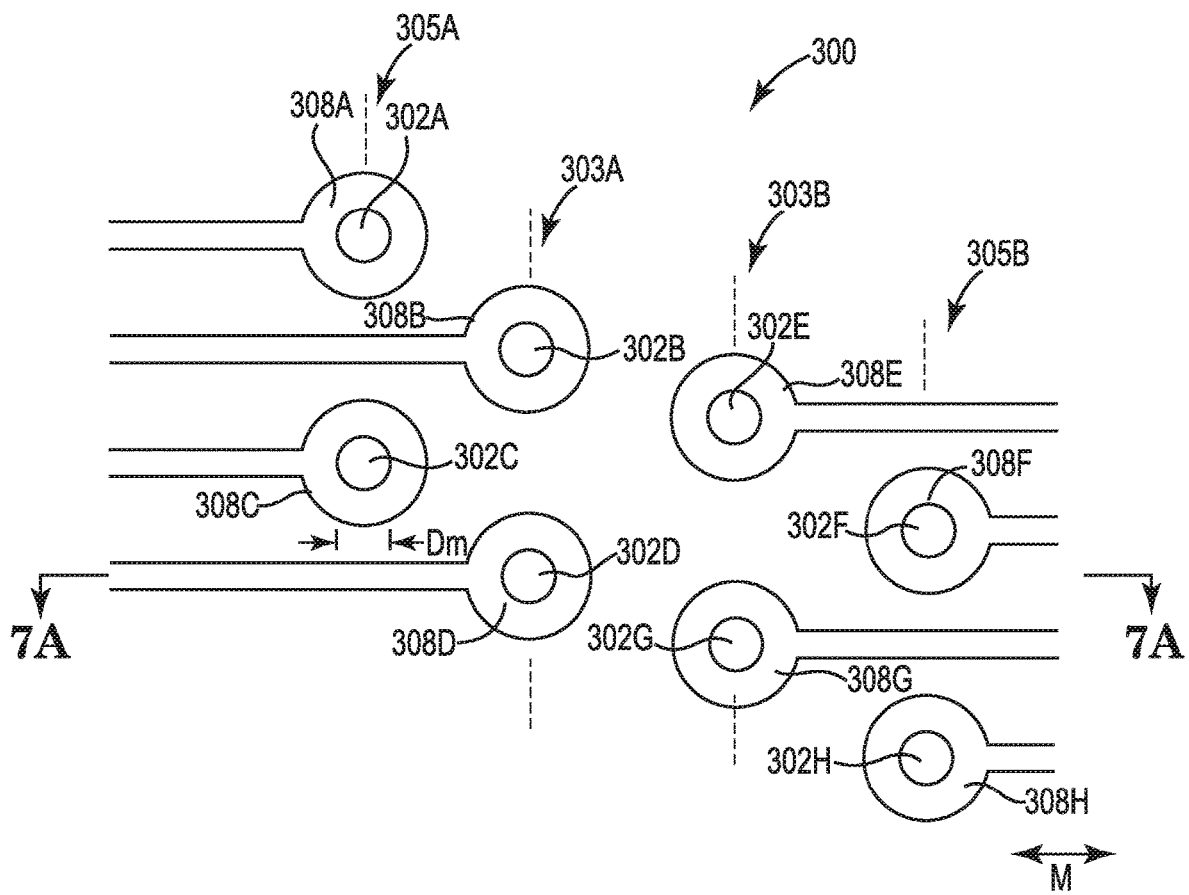
FIG. 7B is a diagram including a plan view schematically illustrating individual electrodes with nozzles as formed in a first layer on a dielectric material layer, according to one example of the present disclosure.

FIGS. 7A-7B are diagrams illustrating examples of non-charge generating addressable electrode grid arrays that can be used in ion writing units 120, 150, and 202 of FIGS. 4-7B, according to at least some examples of the present disclosure. The electrode grid arrays enable high resolution imaging of passive e-paper media.

In general terms, at least some of the electrode arrays include a plurality of nozzles or holes extending through a dielectric material layer and through at least two layers of conductive material separated by the dielectric material layer, which has a thickness T. In some examples, the conductive layers are made of copper and include at least one additional plated layer, such as electroless nickel and gold or immersion Tin. In one aspect, this arrangement provides thin protective finishing layers on the copper and prevents corrosion of the copper in the charge plasma environment.

In one aspect, the size of the holes in the electrode array limits the minimum size of dots for imaging digital media images. Circular holes have a diameter Dm, but the holes can be other suitable shapes, such as rectangular. In some examples, each of the holes is circular and less than 150 micrometers in diameter. In some examples, each of the holes is circular and less than 100 micrometers in diameter to provide 300 dots per inch and higher resolution.

In each of the electrode arrays, there is a range of aspect ratios T/Dm for which conditions exist where charges can be blocked and passed through the electrode arrays. If the aspect ratio T/Dm is much greater than 1, it is difficult to pass charges through the holes in the electrode array, and if the aspect ratio T/Dm is much less than 1, it is difficult to prevent charges from passing through the electrode array. In some examples, the optimal aspect ratio T/Dm is about 1, such that the dielectric material layer is relatively thin and on the order of 25-100 micrometers in thickness T for high resolution imaging. In some examples, the dielectric material layer is a flexible circuit material. In some examples, the dielectric material layer is a polyimide that has a high dielectric strength and provides for chemical etching or laser ablation to open small accurate holes with non-conductive walls.

FIGS. 7A and 7B are diagrams schematically illustrating a non-charge generating, addressable electrode grid array 300, according to one example of the present disclosure. The array 300 includes multiple holes or nozzles 302 that extend through dielectric material layer 304, first conductive electrode layer 306, and second conductive electrode layer 308. In some examples, dielectric material layer 304 is a dielectric film. In some examples, each of the first and second conductive electrode layers 306 and 308 includes copper.

FIG. 7A is a cross-section diagram of electrode array 300 taken along the line 7A-7A in FIG. 7B. Dielectric material layer 304 has thickness T, a second side 310, and a first side 312 that is opposite second side 310. Second electrode layer 306 is on second side 310 of dielectric material layer 304 and first electrode layer 308 is on first side 312 of dielectric material layer 304. Dielectric material layer 304 includes the holes 302 that extend through dielectric material layer 304 from second side 310 to first side 312 and that extend through second electrode layer 306 and first electrode layer 308. Second electrode layer 306 is formed around the circumference of each of the holes 302 to surround the holes 302 on second side 310 and provide a common electrode for the holes 302. Each of the holes 302 has a diameter Dm.

FIG. 7B is a diagram schematically illustrating, in one example of the present disclosure, individual electrodes 308-308H formed in second electrode layer 308 on dielectric material layer 304. In some instances, such individual electrodes are referred to as finger electrodes. Each of the finger electrodes 308A-308H has a circular landing pad formed around the circumference of a corresponding one of the holes 302A-302H on second side 312, such that finger electrode 308A is formed around the circumference of hole 302A, finger electrode 308B is formed around the circumference of hole 302B, and so on. Each of the finger electrodes 308A-308H surrounds the corresponding one of the holes 302A-302H to provide a single finger electrode 308A-308H for the corresponding one of the holes 302A-302H. Also, each of the finger electrodes 308A-308B is individually addressable, such that each of the holes 302A-302H is individually addressable to control the flow of charges through each of the holes 302A-302H separately.

In operation, temporal and spatial control of charges flowing through electrode array 300 is achieved by individually addressing finger electrodes 308A-308H to apply on state or off state electrical potentials between finger electrodes 308A-308H and the common electrode of second electrode layer 306.

FIG. 8A is a block diagram schematically illustrating a control portion 350, according to one example of the present disclosure. In some examples, control portion 350 includes a controller 352, a memory 354, and a user interface 356. In some examples, memory 354 stores calibration module 360, which facilitates calibrating an ion writing unit, as further described below and throughout the present disclosure.

In general terms, controller 352 of control portion 350 comprises at least one processor 353 and associated memories that are in communication with memory 354 to generate control signals directing operation of at least some components of the systems and components described throughout the present disclosure. In some examples, these generated control signals include, but are not limited to, controlling general operation of an ion writing unit as well as calibrating an ion writing unit relative to a passive e-paper. In some examples, a control portion 350 is present in the ion writing assembly 20 FIG. 1B for operation of/with the ion writing units 21, 120, 150, 200 in association with at least FIGS. 1B, 4-7B and sensor 50 (at least FIGS. 1B, 3A-3B).

In particular, in response to or based upon commands received via a user interface 356 and/or machine readable instructions (including software), controller 352 generates control signals to write content to passive e-paper and/or calibrate an ion writing unit, in accordance with at least some of the previously described examples and/or later described examples of the present disclosure. In some examples, controller 352 is embodied in a general purpose computer while in some examples, controller 352 is embodied in the various ion writing assemblies described throughout the present disclosure.

For purposes of this application, in reference to the controller 352, the term "processor" shall mean a presently developed or future developed processor (or processing resources) that executes sequences of machine readable instructions (such as but not limited to software) contained in a memory. In some examples, execution of the sequences of machine readable instructions, such as those provided via memory 354 of control portion 350 cause the processor to perform actions, such as operating controller 352 to perform calibration of an ion writing unit as generally described in (or consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium, as represented by memory 354. In some examples, memory 354 comprises a computer readable tangible medium providing non-volatile storage of the machine readable instructions executable by a process of controller 352. In other examples, hard wired circuitry may be used in place of or in combination with machine readable instructions (including software) to implement the functions described. For example, controller 352 may be embodied as part of at least one application-specific integrated circuit (ASIC). In at least some examples, the controller 352 is not limited to any specific combination of hardware circuitry and machine readable instructions (including software), nor limited to any particular source for the machine readable instructions executed by the controller 352.

In some examples, user interface 356 comprises a user interface or other display that provides for the simultaneous display, activation, and/or operation of at least some of the various components, functions, features, and of control portion 350 and/or ion writing assemblies, as described throughout the present disclosure. In some examples, at least some portions or aspects of the user interface 356 are provided via a graphical user interface (GUI).

FIG. 8B is a block diagram schematically illustrating a total charges-per-dot parameter 365, according to one example of the present disclosure. In some examples, a calibration for an ion writing unit is performed via calibration module 360 based on image optical intensity and according to at least the total charges-per-dot parameter 365, as further described generally in association with at least FIGS. 9A-15 and particularly in association with total charges per dot parameter 453 in FIG. 9D.

With this larger context in mind, further details regarding examples of a calibration module 360 will now be described in association with at least FIGS. 9A-15.

Figure 9D:
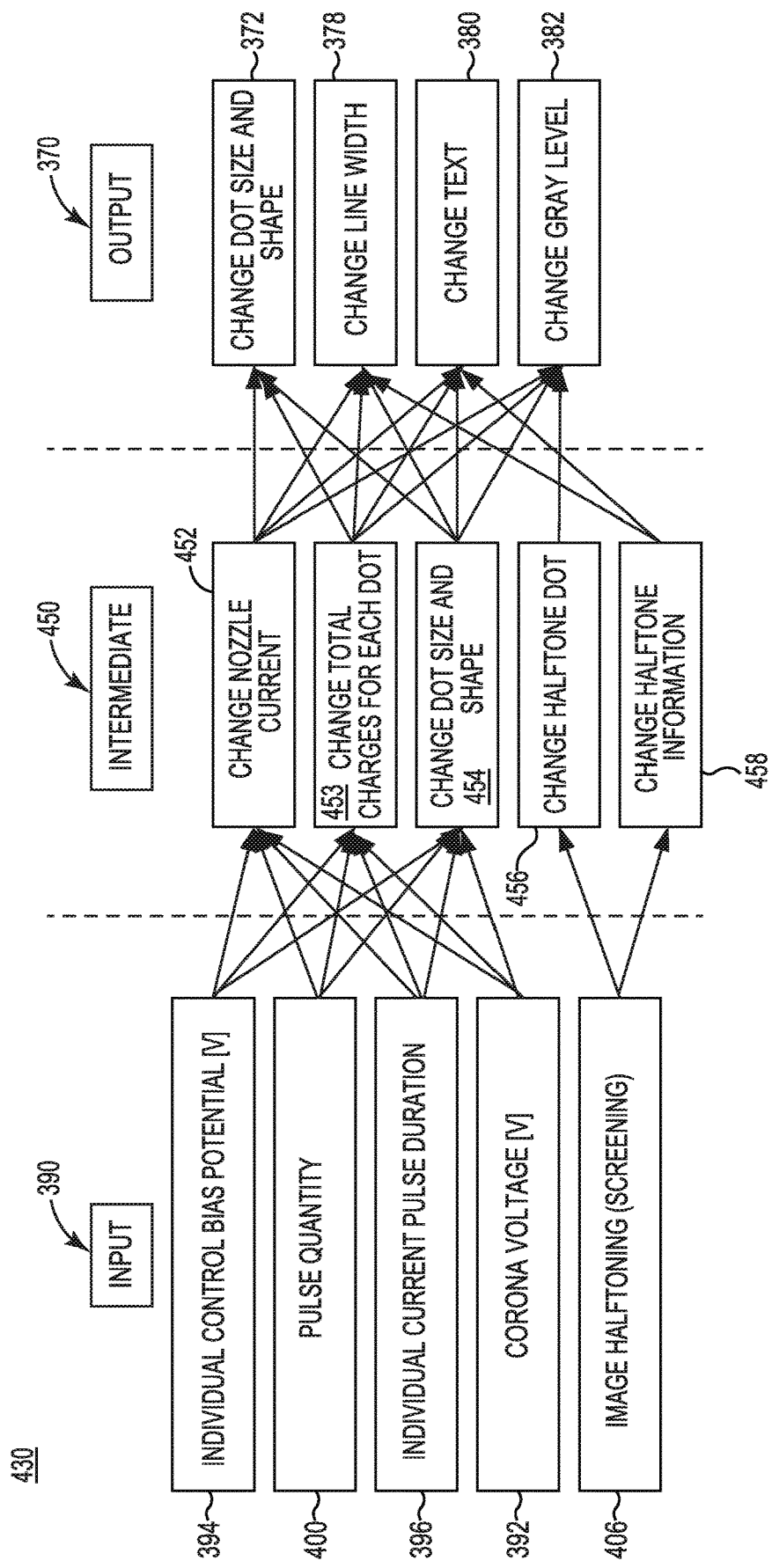
FIG. 9D is a diagram schematically illustrating a plurality of calibration pathways, according to one example of the present disclosure.

First, FIGS. 9A-9C illustrate examples of various functions and parameters associated with performing a calibration of an ion writing unit to achieve image consistency and quality. FIG. 9D then illustrates an interrelationship of such functions and parameters in performing a calibration according to calibration adjustment pathways, according to one example of the present disclosure.

FIG. 9A is a block diagram of a target function 370, according to one example of the present disclosure, which comprises part of calibration module (40, 360). In general terms, target function 370 includes at least one parameter of a plurality of target parameters 372, 378, 380, 382, 384 concerning the targeted appearance of content markable (via an ion writing unit) on a passive e-paper. It will be understood that the identified parameters 372, 378, 380, 382, 384 are not an exhaustive list of potential target parameters. Moreover, in some examples, just one such parameter defines target function 370. However, in some examples, it will be further understood that more than one parameter defines target function 370. In addition, in some examples, at least some parameters of target function 370 are independent of each other while in some examples, at least some of the parameters are interdependent or cooperative. In one aspect, at least some of the parameters associated with target function 370 correspond to a response by passive e-paper to actions of an ion writing unit.

In some examples, target function 370 includes a dot size/shape parameter 372 representing a size and/or shape of dots (e.g. dot 102A in FIG. 2B) being written by associated nozzles 32 of an electrode array 30 of an ion writing unit. In some examples, target function 370 includes a line width parameter 378 representing a line width formed by a column of dots (e.g. dot 102A in FIG. 2B) being written by associated nozzles 32 of an electrode array 30 of an ion writing unit. In some examples, the line width parameter 378 is associated with lines written on passive e-paper, as opposed to images, such as graphics, photos, etc. In some examples, a text boldness parameter 380 represents text being written by associated nozzles 32 of an electrode array 30 of an ion writing unit. In some examples, a gray level parameter 382 represents a gray level being written by associated nozzles 32 of an electrode array 30 of an ion writing unit. In some examples, an image corners parameter 384 represents an appearance of image corners as written by associated nozzles 32 of an electrode array 30 of an ion writing unit.

In general terms, among other relationships and consequences, changes in the appearance of content (formed on passive e-paper in response to deposited charges flowing from selectable, controllable nozzles 32), such as changes in dot size/shape, line width, text, grey level, causes a change in the image optical intensity. Moreover, changes in the appearance of such parameters is driven by changes in operational parameters of the ion writing unit relating to the nozzles, corona, etc., which are governed via a controls function 390, which is described below in association with at least FIGS. 9B, 9D. Accordingly, further details regarding at least some of the respective parameters of target function 370, any relationship among them, and their relation to parameters of controls function 390, are described below in association with at least FIGS. 9B-15.

In some examples, performing calibration separately for line width greatly enhances qualities such as reducing graininess that sometimes affects texts and/or lines in formed images. In implementations where a passive e-paper might be employed as a transaction media (financial or informational), in which accuracy and neatness in alphanumeric characters or in bar codes is paramount, it is desirable to calibrate an ion writing unit specifically for line width on passive e-paper. Moreover, to the extent that such ion writing units may be employed in retail environments, which are not as carefully controlled as a dedicated imaging site, at least some examples of the present disclosure provide for calibrating line widths to ensure accuracy in using financial transaction media embodied in passive e-paper.

While calibrating for line widths produced by an ion writing unit are beneficial in optimizing writing performance for text, such calibration is also beneficial for other particular graphics, such as bar codes, QR codes, etc. that may include a significant quantity of linear features.

In some examples, calibrating for line width is highly correlated with a dot size/shape parameter 372 of target function 370, as in some instances, a width of such lines is equivalent to dot size (e.g. diameter).

FIG. 9B is a block diagram of a controls function 390, according to one example of the present disclosure, which comprises part of calibration module (40, 360). In general terms, controls function 390 includes at least one parameter of a plurality of control parameters 392, 394, 396, 400, 406 concerning mechanisms to cause a change in the targeted appearance of content markable (via an ion writing unit) on a passive e-paper. It will be understood that the identified parameters 392, 394, 396, 400, 406 are not an exhaustive list of potential control parameters. Moreover, in some examples, just one such parameter defines controls function 390. However, in some examples, more than one such parameter defines controls function 390. In addition, in some examples, at least some such parameters of controls function 390 are independent of each other while in some examples, at least some of the parameters of controls function 390 are interdependent or cooperative with each other.

In some examples, controls function 390 is not strictly a component of the calibration module 360, but rather an independent module within control portion 350 for general control of a corona wire and/or nozzles, and is in communication with or coupled to the calibration module 360 to implement the functions of the calibration module 360.

In some examples, controls function 390 comprises a corona voltage parameter 392 for monitoring and selecting a voltage level of the corona wire (166 in FIG. 5; 222 in FIGS. 6A-6B). As further shown in FIG. 9D, in some examples changes in the corona voltage parameter 392 affects at least a change in nozzle current parameter (at 452), a change in dot size/shape (at 454), and/or a change in the total charges deposited for each dot (at 453).

Adjustments in the corona voltage affect a corona plasma intensity, and therefore changes the ion and electron flux towards the nozzles, which in turn changes the nozzle current that determines a volume or rate of ions passing through the nozzles of the electrode array. This effect, in turn, affects the number of charges deposited onto the e-paper, which in turn, affects image optical intensity. In one aspect, it will be noted that adjustments to the corona voltage affect all the nozzles and can be used, in some examples, to compensate for general current variation of the ion head originated, for example, from corona wire aging, or humidity changes.

In some examples, controls function 390 includes an individual bias potential parameter 394, which monitors and controls the bias potential at each individual nozzle, such as the voltages at electrode layers 232, 234 (FIGS. 6A, 6B) for each nozzle, which act as a gate or switch to let ions pass through the nozzle (hole 240 in FIGS. 6A, 6B). In particular, the voltage at each layer 232, 234 for each individual nozzle (e.g. 302A-302G in FIGS. 7A-7B) is adjustable to adjust the volume or rate of ions passing through the nozzle. As further shown in FIG. 9D, in some examples changes in the individual bias potential parameter 404 affects at least a change in the nozzle current (452), a change in dot size/shape (454), and/or a change in the total charges deposited for each dot (453).

In some examples, controls function 390 includes an individual current pulse duration parameter 396, which monitors and controls the duration of a single current pulse at each individual nozzle, such as at electrode layers 232, 234 (FIGS. 6A, 6B) for each nozzle, which act as a gate or switch to let ions pass through the nozzle (hole 240 in FIGS. 6A, 6B). In particular, the current pulse duration at each individual nozzle (e.g. 302A-302G in FIGS. 7A-7B) is adjustable. As further shown in FIG. 9D, in some examples changes in the individual current pulse duration parameter 396 affects a change in at least the nozzle current (452), a change in dot size/shape (454), and/or change in the total charges deposited for each dot (453). In this example, an individual current pulse duration defines the minimal interval of nozzle firing time.

In some examples, the individual current pulse duration is set to be the same for all nozzles and set to compensate for general current variation of the ion head originated, for example, from corona wire aging, or humidity changes. In some examples, individual current pulse duration parameter 396 is used to compensate for corona current changes instead of modifying the corona voltage parameter 392. In another example, the individual current pulse duration is used to bring the pulse quantity parameter 400 to occupy about 50% of the number of subpixels at a nominal work point to allow enough margin for use of the pulse quantity parameter 400 to compensate for changes in line width 378, text quality 380, gray level 382, dot size/shape 372, corners, nozzle to nozzle uniformity etc In some examples, controls function 390 comprises a pulse quantity parameter 400, which monitors and controls the number of individual current pulses that will be used to build or define each pixel at each individual nozzle (e.g. 302A-302G in FIGS. 7A-7B), as will be further described in association with at least FIGS. 12A-12B. As further shown in FIG. 9D, in some examples changes in the pulse quantity parameter 400 affects a change in at least the nozzle current (452), change in dot size/shape (454), and/or change in the total charges deposited for each dot (453).

In one aspect, the parameters 392, 394, 396, and 400 in controls function 390 are physical controls in the sense that a change in each parameter is initiated or expressed via a physical manifestation, while the below-described image halftoning parameter 406 is a digital control in the sense that a change in this parameter is not necessarily initiated via a direct physical manifestation.

In some examples, controls function 390 comprises an image halftoning parameter 406. As further shown in FIG. 9D, in some examples changes in the image halftoning parameter 406 affects a change in at least halftone dot 456, which in turn causes a change in a gray level parameter 382 (of target function 370). Meanwhile, changes in the imaging halftoning parameter 406 (of controls function 390) affects a change in halftone information (458), which in turn, causes a change in line width (line width parameter 378) and/or text quality (text boldness parameter 380).

FIG. 9C is a block diagram of a calibration reference function 420, according to one example of the present disclosure. In general terms, the calibration reference function 420 monitors and cooperates with sensor 50 (FIG. 1, 2A-2B) to obtain and evaluate sensed images of passive e-paper to determine image optical intensity in association with the parameters of the target function 370 and to controls function 390 to make adjustments in the writing operation of ion writing unit to achieve a desired performance relative to images formed on a passive e-paper.

In some examples, the calibration reference function 420 includes an optical density parameter 430, which drives and monitors determining an optical density, regardless of a particular modality by which the optical density is measured, evaluated, determined, etc.

In some examples, the calibration reference function 420 includes a dot area parameter 432 which cooperates with the optical density parameter 430 according to methods for determining optical density, such as via the Murray-Davies equation, and via various sensor modalities, as previously described in association with at least FIGS. 1B and 3A-3B.

In some examples, the calibration reference function 420 includes a lookup table (LUT) parameter 434, which provides at least one tabular database regarding correlations between values and determinants of various parameters of the ion writing function 390 and/or the target function 370 relative to optical density and dot area obtained via a sensor. Such lookup tables facilitate manual or automatic adjustments to achieve a desired calibration.

As previously noted, FIG. 9D is a block diagram 430 schematically illustrating a group 431 of calibration adjustment pathways, according to one example of the present disclosure. As shown in FIG. 9D, in some examples, a calibration adjustment is initiated via operation of at least one of the parameters 392, 394, 396, 400, and 406 of an input function 390 (i.e. controls function 390), which affects at least one parameter of a plurality 450 of intermediate parameters (at 452, 453, 454, 456, 458) as previously described. Changes in these intermediate parameters, in turn, produces a changed appearance in the content on e-paper, as represented via at least one of the parameters 372, 378, 380, and 382 of output function 370 (i.e. target function 370).

While FIG. 9D illustrates multiple parameters 392, 394, 396, 400, 406 of a controls function 390 (i.e. input function), it will be understood from the description accompanying FIGS. 9A-9B that in some examples, operation of calibration module 360 does not necessarily mandate engagement of every parameter 392, 394, 396, 400, 406 to perform a calibration. Moreover, in some examples, calibration involves adjusting a combination of control parameters 392, 394, 396, 400, 406. Moreover, in some examples, just one such control parameter 392, 394, 396, 400, 406 may achieve a desired result in performing a calibration. In addition, in some examples, several control parameters are employed in performing a calibration, but are employed in series and not in parallel.

Figure 10A:
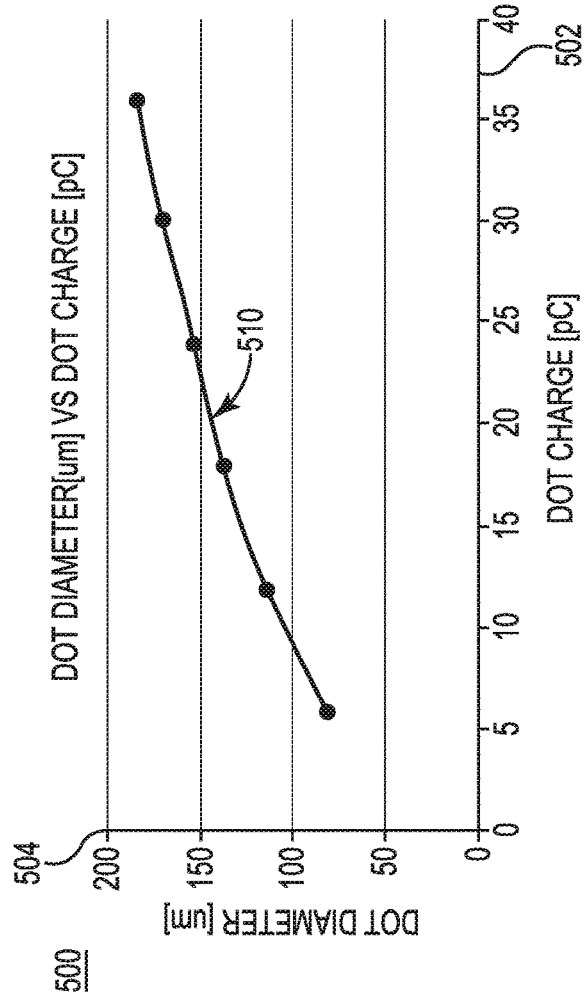
FIG. 10A is a diagram including a graph schematically illustrating a relationship between a dot diameter and a dot charge, according to one example of the present disclosure.

With this in mind, various examples of calibration pathways and relationships expressed in FIG. 9D are illustrated and described in association with at least FIGS. 10A-12D. FIG. 10A is diagram 500 including a graph plotting a correlation signal 510 between dot diameter (e.g. dot size) and dot charge, according to one example of the present disclosure. In some examples, the values of dot diameter (in microns) are represented by the y-axis (504) in FIG. 10A correspond to or are associated with the dot size/shape parameter 372 of target function 370 in FIG. 9A. In some examples, the values of dot charge (in pC) represented by the x-axis (502) in FIG. 10A correspond to or are associated with the "intermediate" total charge-per-dot parameter 453 (FIG. 9D).

As shown in the diagram 500, there is a generally direct relationship between the total charge deposited on a particular dot (e.g. dot 102A in FIG. 2B) and the diameter for that particular dot. Accordingly, in one aspect, diagram 500 illustrates that a change in the total charge-per-dot parameter 453 will cause corresponding changes in the dot diameter, and therefore a change in the dot size/shape parameter 372 (FIG. 9A, 9D). As previously described in association with FIG. 9B, 9D, a change in one (or a combination) of control parameters 392, 394, 396, 400, 406 is employed to affect a change in the total charges-per-dot parameter 453.

In some examples, changing a total number of charges deposited on e-paper on a per dot basis is achieved via changing a nozzle current via an individual nozzle current pulse duration parameter 396 (FIG. 9B) while maintaining a constant duty cycle. In some examples, the nozzle current is modified via changing the bias potential (parameter 394 in FIG. 9A, 9D) across the nozzle by changing the Voltage of the respective electrode layers (232, 234 in FIGS. 6A, 6B) forming the nozzle (e.g. 240 in FIG. 6A, 6B). Such relationships are further illustrated later in association with at least FIG. 11B.

In some examples, changing a total number of charges deposited on e-paper on a per dot basis is achieved via changing a nozzle duty cycle (e.g. pulse frequency) while maintaining a constant nozzle current via individual current pulse duration parameter 396 (FIG. 9B, 9D). One example of such a relationship is further illustrated later in association with at least FIG. 11A.

Figure 10B:
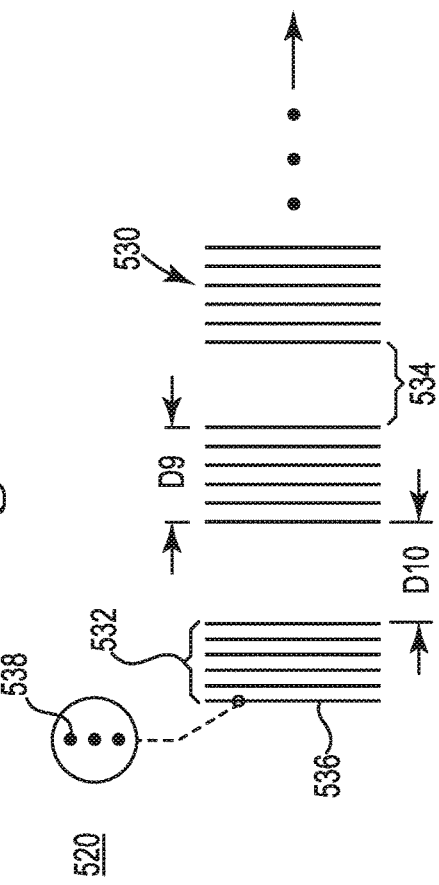
FIG. 10B is diagram schematically illustrating aspects of a line width parameter of a calibration module, according to one example of the present disclosure.

FIG. 10B is a diagram 520 schematically illustrating a line width calibration pattern 530, according to one example of the present disclosure. In some examples, the line width calibration pattern 530 is associated with line width parameter 378 of target function 370 (FIG. 9A, 9D). In general terms, the line width calibration pattern 530 provides a series of spaced apart groupings 532 of lines 536, with each line being formed by a column 538 of spaced apart dots (e.g. dot 102A in FIG. 2B). In some examples, spaces 534 are interposed between the respective groupings 532 of lines 536. One purpose of the line width calibration pattern 530 is to enable calibration of an individual line width, such as line in an image having a dimension (e.g. width) on the scale of just one or two dots 102A. Because an individual line would have a width of just 100 microns (in some examples), it would be below the available resolution of commercially available sensors that sense percentage dot area and image optical intensity for areas on the order of 3-4 millimeters (e.g. 3000-4000 microns), which is at least one order of magnitude greater than the line width of interest (e.g. 100 microns). Accordingly, the line width calibration pattern 530 is employed as a mechanism or surrogate by which an ion writing unit can be calibrated for line widths. To do so, a calibration module 360 (FIG. 8A) directs formation of a line width calibration pattern 530 on test e-paper according to groupings 532 of many line widths (e.g. 10) such that each grouping 532 has a size/duration (D9) commensurate with the resolution and field of view (60 in FIG. 3B) of the sensor obtaining an image of the test e-paper. Moreover, the alternating groupings 532 (of lines 536) and spaces 534 (having duration/size D10) are arranged to correspond to an intended percentage dot area, such as 50 or 55%, thereby effectively setting a standard reference value by which periodic comparisons of variable image optical intensity can be made when applying a relational tool, such as the earlier noted Murray-Davies equation. By making adjustments to calibrate the ion writing unit based on the groupings 532 (of lines 536) of calibration line width pattern 530, the calibration module 40, 630 is in effect making adjustments for each line width and not just for a grouping of lines. It will be understood that the groupings can have greater or fewer than 10 lines in a grouping and that in some examples, each line has width greater or less than 100 microns.

To achieve the desired line width, one calibration pathway (or a combination of calibration pathways) in FIG. 9D is employed. For example, any one of the control parameters 392, 394, 396, 400, 406 affects numerous intermediate parameters (452, 453, 454, 458) which influence line width parameter 378.

Figure 11A:
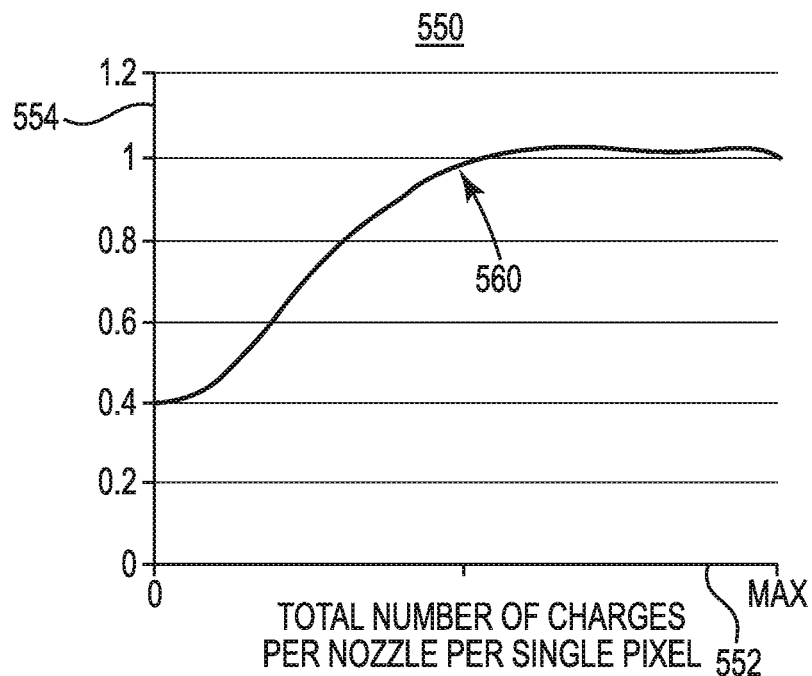
FIG. 11A is a diagram including a graph schematically illustrating of total charges relative to image optical density, according to one example of the present disclosure.

FIG. 11A is a diagram 550 including a graph schematically representing the plot of a correlation signal 560 between image optical density and total number of charges ejected from a nozzle per a single pixel, according to one example of the present disclosure. In some examples, the values of image optical density as represented by the y-axis (554) in FIG. 11A correspond to or are associated with the image optical density parameter 430 of calibration reference function 420 in FIG. 9C. In some examples, the values of a total number of charges ejected from a nozzle per a single pixel represented by the x-axis (552) in FIG. 11A correspond to or are associated with the pulse quantity parameter 400 and/or individual current pulse duration parameter 396 in FIGS. 9B, 9D.

In some examples, as shown in FIG. 11A, the correlation signal 560 indicates a generally direct relationship in which image optical density (along y-axis 554) increases as the total number of charges ejected from a nozzle per a single pixel (x-axis 552) increases. In one aspect, the x-axis 552 represents a scale of zero to a maximum total number of charges (ejected per nozzle per a single pixel) defined for the system. In some examples, this relationship is exhibited when individual current pulse duration (e.g. parameter 396) reaches about 50% duty cycle, as shown in FIG. 12B where the nozzle "on" time corresponds to 7 of 14 bits, at which the image optical density reaches a maximum or saturation level, and no more increases in image optical density occur.

Accordingly, in one aspect, diagram 550 illustrates that a manipulation of the current pulse duty cycle will cause corresponding changes in the image optical density, or conversely that a sensed image optical density may indicate information about the suitability of a particular setting or value of the nozzle duty cycle parameter 406 as it relates to image quality or consistency.

Figure 11B:
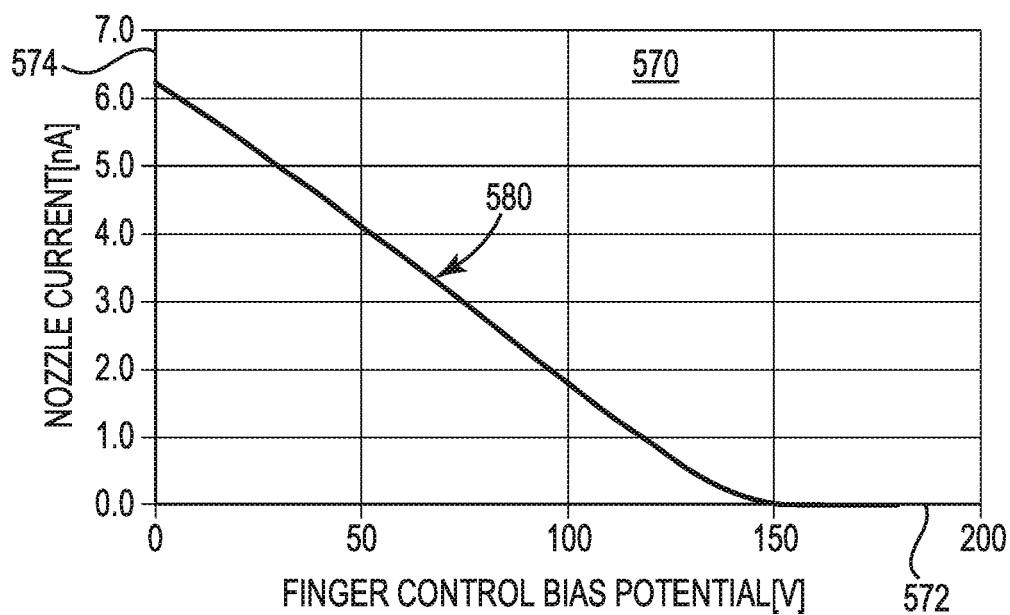
FIG. 11B is a diagram including a graph schematically illustrating a relationship between nozzle current and individual nozzle bias potential, according to one example of the present disclosure.

FIG. 11B is a diagram 570 including a graph schematically representing the plot of a correlation signal 580 between nozzle current and an individual nozzle bias potential, according to one example of the present disclosure. In some examples, the values of nozzle current (nA) are represented by the y-axis (574) in FIG. 11B, which corresponds to the "intermediate" nozzle current parameter 452 FIG. 9D. In some examples, the values of the individual nozzle bias potential (Voltage) as represented by the x-axis (572) in FIG. 11B correspond to or are associated with the individual bias potential parameter 394 of control function 390 in FIGS. 9B, 9D.

In some examples, as shown in FIG. 11B, the correlation signal 580 indicates a generally direct relationship in which, as the bias potential (x-axis 572) increases, the nozzle current (y-axis 574) decreases, thereby limiting flow of ions through the individual nozzle. This relationship continues until the bias potential reaches about 150 Volts (in some examples), at which the time, the current is zero and the flow of ions has completely stopped.

Accordingly, in one aspect, diagram 570 illustrates that a manipulation of the bias potential 404 in ion writing function 390 will cause corresponding changes in the nozzle current (and flow of ions), which in turn causes a change in dot size/shape parameter 372, line width parameter 378, text boldness parameter 380, and/or gray level parameter 382, as shown in FIG. 9D. With information from this relationship, the calibration module 360 can monitor and/or make adjustments in a setting or value at least the individual bias potential parameter 394 to affect image optical intensity to modify image quality or consistency.

FIG. 12A is a diagram 600 including a graph plotting a representation of a train 610 of pulses 612 from a single nozzle (of the electrode array of an ion writing unit) to form a single dot (i.e. single pixel), according to one example of the present disclosure. As shown in FIG. 12A, time is plotted along an x-axis 602, while a voltage (e.g. nozzle bias potential) is plotted along a y-axis 604 to represent opening (O) or closing (C) of the nozzle. In some examples, given an imaging speed of 1.5 inches/second at 300×300 dpi, placement of a single dot or pixel corresponds to about 2200 pseconds. In one implementation, this overall pulse duration of 2200 pseconds is divisible into 16 bits or pulse cycles, at 137 pseconds/bit, with each pulse cycle including a single opening and a single closing of the nozzle defined as individual current pulse duration 396 with a duty cycle of up to 100%. At 50% duty cycle, the "on" time will be in this example 137/2 psec with "on" time for a single pulse 612A being represented in FIG. 12A as W2$p$, which represents a portion or percentage of a maximum pulse duration W2. In one aspect, the ratio of W2$p$/W2 defines a single pulse duty cycle, such as 50 percent. In one aspect, with 4800 dpi nozzle addressability, each pixel is divided to 16 subpixels, with each width being 1/16 of the dot frequency.

In some examples, the max time allocated for charge firing from a nozzle per a single pixel has an overall duration represented by W1 in FIG. 12A.

In general terms, the train 610 of pulses as shown in FIG. 12A is configured to produce a generally circular dot (i.e. pixel), as shown in FIG. 12O. In some examples, an increase in the individual nozzle current pulse duration (e.g. W2$p$), causes an increase in the total number of charges per dot, which results in a change in both the shape and size of the dot. In some examples, the change expresses itself as the dot becoming more oval-shaped, as shown by length (L) in FIG. 12D exceeding the diameter (D12 in FIG. 12C) of the baseline dot size/shape, with elongation occurring in the direction of media travel. It will be understood that other parameters of control function 390 (FIG. 390) can produce a change in the size/shape of a dot, and that FIGS. 12C-12D are provided to illustrate the results from employing just one parameter (e.g. individual nozzle current pulse duration 396) to cause the change in dot size/shape. At least some aspects of this adjustment are further described later in the context of the kind function 770 in association with at least FIGS. 13A-13C.

In some examples, each pulse 612 of the train 610 in FIG. 12A is defined as corresponding to and producing a subpixel (i.e. subdot). To further calibrate an ion writing unit, an individual current pulse parameter 396 of controls function 390 in FIG. 9B, 9D is employed. Via this parameter 396, the current pulse duration for each nozzle is adjustable to compensate for color drift due to aging, environmental changes (e.g. humidity, temperature, etc.), different batches of nozzles, etc. As previously described in association with at least FIG. 9D, via adjusting the quantity of current pulses (i.e. the number of subpixels) to build or define each pixel (parameter 400), each part of an image (e.g. dot, line, text, gray level) can be assigned a different number of subpixels (i.e. quantity of pulses) up to the maximum number of subpixels, which in examples of FIG. 12A example is set to 16.

Accordingly, FIG. 12B illustrates one pulse in a 14 bit representation at 9.8 pseconds per bit. At least some aspects of calibration associated with the pulse quantity parameter 400 are further described in association with FIGS. 13A-13O.

FIG. 13A is a flow diagram 700 schematically illustrating a method 701 of calibrating an ion writing unit, according to one example of the present disclosure. It will be understood that method 701 provides just one example of calibrating an ion writing unit and that other methods of calibrating an ion writing unit can be performed while still employing the functions and features of at least some of the components, assemblies, arrays, systems as previously described in association with at least FIGS. 1A-12D.

In some examples, as shown at 710 in FIG. 13A, method 701 includes triggering a calibration. In some examples, the calibration is triggered manually by an operator, as at 712. In some examples, the calibration is triggered automatically, as at 714. The automatic trigger is based on a frequency, in some examples, as at 716 where the period of the frequency is selectable. In some examples, the automatic trigger is based on an event, as at 718, such as replacement of a consumable, including but not limited to, replacing at least some electrode nozzles.

Once triggered, the calibration begins with producing an imaging job on passive e-paper (i.e. sample image) by which calibration of the ion writing unit can be performed. In other words, content is written onto passive e-paper. In some examples, the job is a special imaging job especially suited for performing calibration and as such, may include various combinations and patterns enhancing such calibration.

At 730, a sensor obtains an image of the job according to the features of the sensor, such as a field of view (e.g. 60 in FIG. 3B). The image sample is evaluated regarding its percentage dot area and optical intensity using tools, such as but not limited to, the Murray-Davies equation as previously described.

At 735, a comparison is made to determine if the obtained image sample meets a criteria regarding performance of the ion writing unit. If the criteria are met, then path 737 (YES) is taken, where method queries at 745 whether the intended set of image samples has been evaluated and any indicated adjustments have been made. If the intended set of evaluations and adjustments are incomplete, then method proceeds along path 746 (NO) to produce another job which can be evaluated according to method 700.

With further reference to decision box at 735, if the criteria is not met, then method 700 proceeds along path 736 (NO), and at least one parameter is adjusted, as at 740. After such adjustment, the query is renewed at 745 whether the evaluation set is complete.

Once all portions of the evaluation set is complete, method 701 ends with a finalized calibration at END 750 in which the adjusted settings of the ion writing unit are saved and employed as the settings for imaging passive e-paper.

In some examples, the criteria in decision box 735 are employed according to a criteria function, as shown in the block diagram 760 of FIG. 13B, according to one example of the present disclosure. In some examples, criteria function 760 includes a parameter factor 762, a margin factor 764, and a setting factor 766. The parameter factor 762 tracks and selects a parameter for which the image sample will be evaluated, and tracks and selects at least one parameter of the calibration module 360 (FIG. 8A) which will be adjusted in an attempt to achieve the desired image optical intensity produced by the ion writing unit. In some examples, the parameter to be adjusted is selected from one of the parameters of the target function 370 (FIG. 9A), of the controls function 390 (FIG. 9B) in cooperation with the calibration reference function 420, or one of the intermediate parameters illustrated at 452, 453, 454, 456, and 458 in FIG. 9D according to the various calibration pathways.

With further reference to FIG. 13B, in some examples the margin factor 764 sets the amount of change (i.e. margin) by which a given criteria is exceeded or missed to drive adjustment of the parameters. In some examples, the setting factor 766 provides the type of adjustment to be made, such as making adjustments in preset increments (e.g. changing bias potential by 25 Volts at a time) or such as selecting a discrete numerical value for a given parameter (e.g. picking a desired bias potential without regard to uniform increments).

In some examples, a calibration of an ion writing unit is performed according to a kind function 770. FIG. 13C is a block diagram schematically illustrating a kind function 770, according to one example of the present disclosure. In general terms, kind function 770 monitors and determines which kind of calibration will be performed and in which sequence. As shown in FIG. 14C, in some examples kind function 770 includes multi parameter 772, a uniformity parameter 774, and a raster image processing (RIP) parameter 776. The multi parameter 772 causes calibration to be performed on an overall basis with respect to a full range of features and qualities of an image producible on a passive e-paper. In some examples, performing calibration according to the multi parameter 772 is employed to adjust the writing performance of an ion writing system to account for various factors, such as but not limited to, spatial variations (e.g. left, right side of image), time variations (e.g. day to day drift), variations between different ion writing units. Additional factors include, but are not limited to, non-uniformities in an individual ion writing unit, variations in the spacing between the ion writing unit and the passive e-paper (e.g. D5 in FIGS. 5-6B), aging, and environmental changes (e.g. temperature, humidity, altitude, etc.). Such adjustments help an ion writing unit to maintain consistency and quality in writing images to passive e-paper.

Figure 14A:
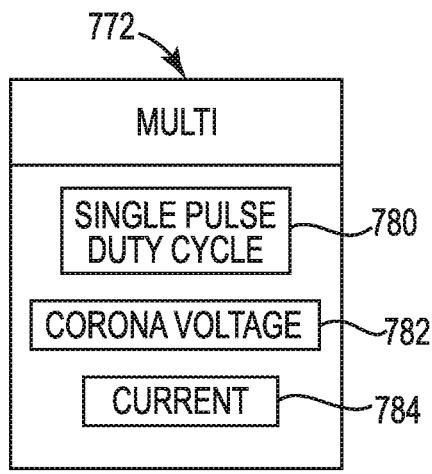
FIG. 14A is a block diagram of a multi-parameter associated with a kind function, according to one example of the present disclosure.
Figure 14B:
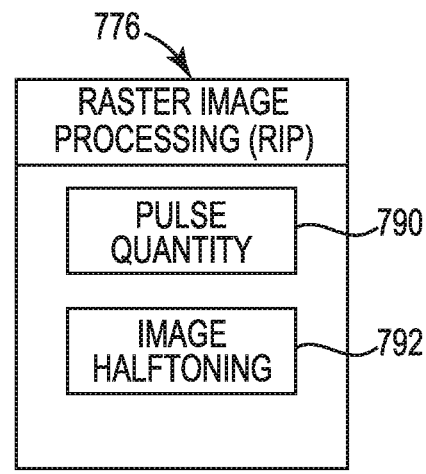
FIG. 14B is a block diagram of a raster image processing (RIP) parameter associated with a kind function, according to one example of the present disclosure.

In some examples, calibrations made according to multi parameter 772 are performed based on a single pulse duty cycle, which is represented via single pulse duty cycle parameter 780 in FIG. 14A. Accordingly, this calibration proceeds according to method 701 in FIG. 13A to determine a single pulse duty cycle for all nozzles to compensate for the above-identified factors. In one aspect, a single pulse duty cycle corresponds to the number of bits (out of the total number of 14 bits shown in FIG. 12B) for which the nozzle is open to define a single pulse 612A in FIG. 12A. In some examples, the single pulse duty cycle is expressed as a percentage of on/off, such that a pulse that is "on" for 7 bits (out of 14) corresponds to a 50 percent duty cycle. In one aspect, the "on" time corresponds to W$2p$ in FIGS. 12A, 12B. In one aspect, the single pulse duty cycle parameter 780 is related to the individual current pulse duration (FIGS. 9B, 9D) in that the individual current pulse duration is represented by W$2p$ (FIGS. 12A, 12B), which provides another quantitative expression of the duty cycle for a single pulse 612A (FIG. 12A).

However, in some examples, the multi parameter 772 calibration is performed instead according to a corona voltage parameter 782 (FIG. 14A) or a current adjustment (784) consistent with the various calibration pathways illustrated in association with FIG. 9D.

In some examples, calibration according to method 701 is performed per uniformity parameter 774 of kind function 770 (FIG. 13C). In this calibration, each nozzle pixel current is adjusted to compensate for current/charge variations between nozzles. Stated differently, this calibration ensures color uniformity across all the nozzles of the ion writing unit. In some instances, this type of calibration is referred to as achieving charge injection uniformity.

In some examples, a calibration is performed according to raster image processing (RIP) parameter 776 (FIG. 13C). In this calibration, adjustments are made to a subpixel value (e.g. FIG. 12B) for every part of an image for each target parameter, such as dot size/shape 372, line width 378, text boldness 380, gray level 382, image corners 384, in FIGS. 9A, 9D. In some examples, the subpixel value corresponds to the number of pulses 612A or subpixels out of a maximum (e.g. 16) number of pulses 612A subpixels in FIGS. 12A, 12B defined to build a dot or pixel.

In some examples, calibration per the raster image processing (RIP) parameter 776 for the various target parameters is instead performed via image halftoning parameter 406 (FIG. 9B, 9D) alone or in combination with the above-described subpixel value approach.

In some examples, a calibration is performed first according to the multi parameter 772, then separately according to the uniformity parameter 774, and finally according to the raster image processing (RIP) parameter 776. However, in some examples, a calibration can be performed according to just one of multi parameter 772, uniformity parameter 772, and raster image processing (RIP) parameter 776. Moreover, in some examples, the order of performing such calibration tasks can be reversed or re-ordered as desired.

Figure 15:
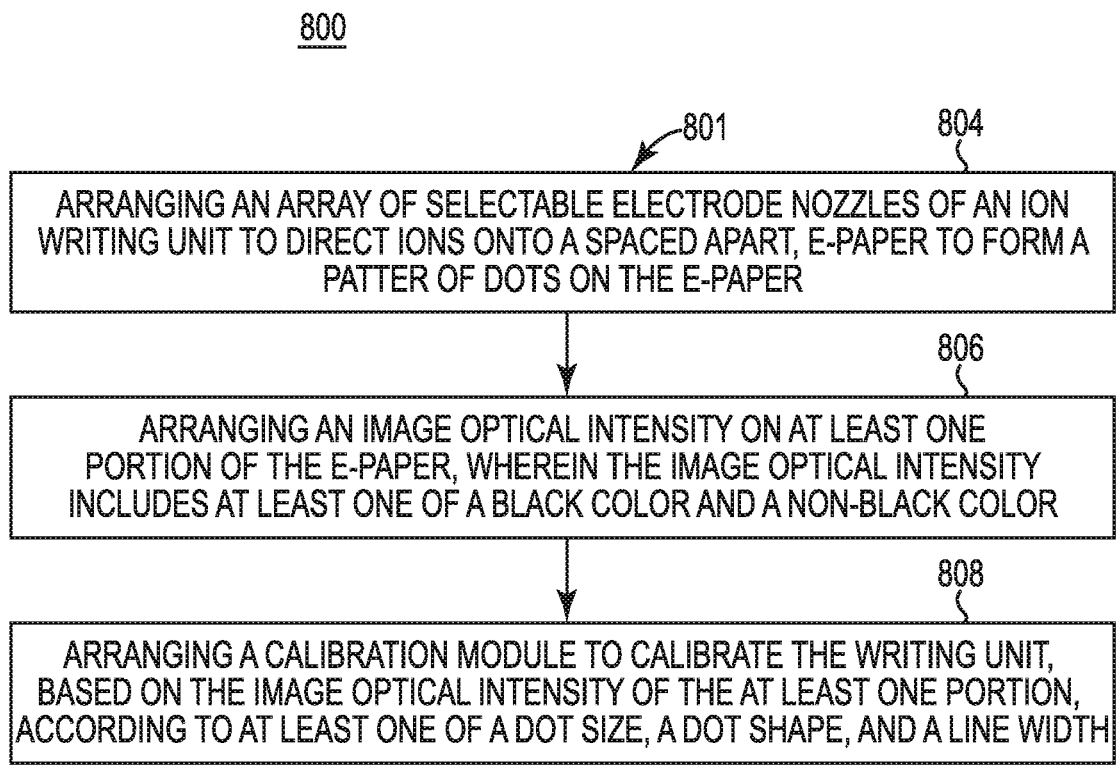
FIG. 15 is a flow diagram schematically illustrating a method of manufacturing an ion writing unit, according to one example of the present disclosure.

FIG. 15 is a flow chart diagram 800 schematically illustrating a method 801 of manufacturing a calibratable ion writing unit, according to one example of the present disclosure. In some examples, method 801 is performed using at least some of the components, assemblies, arrays, systems as previously described in association with at least FIGS. 1A-14C. In some examples, method 801 is performed using at least some components, assemblies, arrays systems other than those previously described in association with at least FIGS. 1A-14B.

In some examples, as shown at 804 in FIG. 15, method 801 includes arranging an array of selectable electrode nozzles of the ion writing unit to direct ions onto a spaced apart, e-paper to form a pattern of dots on the e-paper. As shown at 806, method 801 further includes arranging an optical sensor to image color intensity on at least one portion of the e-paper, wherein the color intensity includes at least one of a black color and a non-black color. In this regard, non-black colors includes colors such as cyan, magenta, yellow while black color simply refers the black as a standalone color. By adopting this convention, the term color intensity is applicable to both black content and/or other color content, and combinations thereof.

At 808, method 801 further includes arranging a calibration module to calibrate the writing unit, based on the imaged color intensity of the at least one portion, according to at least one of a dot size/shape, and a line width.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. An external, contactless writing system for e-paper, the system comprising:
   a writing unit including an ion generator to generate airborne ions and an array of selectable electrode nozzles to direct the airborne ions onto a passive e-paper to form a pattern of dots on the passive e-paper;

a processor; and a non-transitory memory storing machine readable instructions, executable via the processor, to calibrate the writing unit for image optical intensity of at least one of the respective dots, via information from a sensor, according to a total number of charges per dot parameter.

2. The system of claim 1, wherein the sensor comprises a sensor coupled to at least the writing unit, the sensor to sense the image optical intensity.

3. The system of claim 1, wherein the ion generator of the writing unit includes a corona wire at a first voltage to produce the airborne ions, wherein each nozzle operates at a current, and wherein the instructions to calibrate include a nozzle current parameter to modify the current for each respective nozzle based on at least the first voltage and thereby adjust the total number of charges per dot parameter.

4. The system of claim 1, wherein the stored instructions comprises instructions to modify, via a single pulse duty cycle parameter, a single duty cycle of each respective nozzle to adjust the total number of charges per dot parameter.

5. The system of claim 1, wherein the stored instructions comprises at least one of:
   instructions to modify, via a nozzle bias parameter, a bias potential of each respective nozzle to adjust the total number of charges per dot parameter; and
   instructions to, via a pulse quantity parameter control a number of individual current pulses to build each pixel via each respective one of the selectable nozzles.

6. The system of claim 1, wherein the sensor is an optical sensor to sense the image and the instructions comprise instructions to adjust at least one of a dot size/shape parameter, line width parameter, text boldness parameter, image corners parameter, and image halftone parameter.

7. The system of claim 1, wherein the nozzles are adjustable according to a nozzle current uniformity parameter.

8. An external, contactless writing system for e-paper, the system comprising:
   a writing unit including an ion generator to generate airborne ions and an array of selectable electrode nozzles to direct the airborne ions onto a passive e-paper to form a pattern of dots on the passive e-paper;
   a sensor to sense image optical intensity of at least one of the respective dots on the passive e-paper;
   a processor; and
   a non-transitory memory storing machine readable instructions, executable via the processor, to calibrate the writing unit, based on the sensed image optical intensity, according to at least one of a dot size parameter, line width parameter, and a dot shape parameter.

9. The writing system of claim 8, wherein the instructions includes at least one of:
   instructions to modify, via a single pulse duty cycle parameter, a single pulse duty cycle for each nozzle; and
   instructions to, via a pulse quantity parameter, control a number of individual current pulses to build each pixel via each respective one of the selectable nozzles.

10. The writing system of claim 8, wherein the sensor is separate from, and independent of, the writing unit.

11. The writing system of claim 8, wherein the instructions comprises instructions to to perform the calibration based on a known look-up table (LUT) for at least one of: image optical intensity, line width, dot size, text boldness, gray level relative to at least one of nozzle bias potential, nozzle duty cycle, and image halftoning.

12. The writing system of claim 8, wherein the image optical intensity includes at least one of a black color intensity and a non-black color intensity.

13. A method of manufacturing a calibratable writing system, the method comprising:
   arranging an array of selectable electrode nozzles of an ion writing unit to direct airborne ions onto a spaced apart, e-paper to form a pattern of dots on the e-paper;
   arranging an optical sensor to sense image optical intensity on at least one portion of the e-paper, wherein the image optical intensity includes at least one of a black color and a non-black color; and
   arranging a calibration module to calibrate the writing unit, based on the sensed image optical intensity of the at least one portion, according to at least one of a dot size, a dot shape, and a line width.

14. The method of manufacturing of claim 13, wherein the calibration module includes a total charges parameter to adjust the dot size or the dot shape according to an adjustable total number of charges per dot.

15. The method of manufacturing of claim 14, wherein the total charges parameter is based on at least one of a single pulse duty cycle, a nozzle bias potential, a pulse quantity parameter, and a corona voltage of the ion writing unit.

* * * * *